(12) United States Patent
Sano

(10) Patent No.: US 7,221,999 B2
(45) Date of Patent: May 22, 2007

(54) REMOTE CONTROL DEVICE OF BIPEDAL MOBILE ROBOT

(75) Inventor: Shigeo Sano, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 583 days.

(21) Appl. No.: 10/488,055

(22) PCT Filed: Aug. 20, 2002

(86) PCT No.: PCT/JP02/08377

§ 371 (c)(1),
(2), (4) Date: Feb. 27, 2004

(87) PCT Pub. No.: WO03/020476

PCT Pub. Date: Mar. 13, 2003

(65) Prior Publication Data
US 2004/0236467 A1    Nov. 25, 2004

(30) Foreign Application Priority Data
Aug. 29, 2001   (JP)   .............................. 2001-259974

(51) Int. Cl.
*G06F 19/00*   (2006.01)
(52) U.S. Cl. ...................... 700/254; 700/245; 700/246; 700/250; 700/260; 700/261; 700/262; 318/568.12; 318/568.15; 901/1; 901/2; 180/8.1; 180/8.6
(58) Field of Classification Search ................ 700/254, 700/245, 246, 250, 260, 261, 262; 318/568.12, 318/568.15; 901/1, 2; 180/8.1, 8.6
See application file for complete search history.

(56) References Cited
U.S. PATENT DOCUMENTS
4,585,387 A * 4/1986 Jayne ........................ 414/730

(Continued)

FOREIGN PATENT DOCUMENTS
JP     05-318338     12/1993

(Continued)

OTHER PUBLICATIONS
Hirai et al., The development of Honda humanoid robot, IEEE, 1998, pp. 1321-1326.*

(Continued)

*Primary Examiner*—Thomas Black
*Assistant Examiner*—McDieunel Marc
(74) *Attorney, Agent, or Firm*—Rankin, Hill, Porter & Clark LLP

(57) ABSTRACT

When an operator attempts to move a robot from a current position to a desired position, she/he operates a manipulator lever (26) corresponding to a desired direction of a manipulator (23) of a remote control device (22), for example, a number of times corresponding to a predetermined moving amount in the moving direction. At this point, the moving amount for each moving direction depending on this number of operations is set, and a leg of the robot is actuated according to a setting value of the moving amount for each moving direction to move the robot. The moving amount that can be set by the operation of the manipulator lever (26) has a relatively small moving amount that the robot may be moved by performing a lifting/landing action once for each of the legs of the robot, and a relatively large moving amount requiring multiple walking steps of the lifting/landing action for each leg of the robot.

23 Claims, 15 Drawing Sheets

U.S. PATENT DOCUMENTS

| | | | |
|---|---|---|---|
| 5,404,086 A | * | 4/1995 | Takenaka et al. ...... 318/568.12 |
| 5,737,217 A | * | 4/1998 | Nishikawa et al. ........... 700/56 |
| 5,982,389 A | * | 11/1999 | Guenter et al. ............. 345/474 |
| 6,266,576 B1 | * | 7/2001 | Okada et al. ............... 700/245 |

FOREIGN PATENT DOCUMENTS

| JP | 11-262884 | 9/1999 |
|---|---|---|
| JP | 2001-287180 | 10/2001 |
| JP | 2002-210680 | 7/2002 |

OTHER PUBLICATIONS

"Online Mixture and Connection of Basic Motions for Humanoid Walking Control by Footprint Specification", Koie hi Nishiwaki et al., May 21-26, 2001, pp. 4110-4115.

* cited by examiner

REMOTE CONTROL DEVICE OF BIPEDAL MOBILE ROBOT

TECHNICAL FIELD

The present invention relates to a remote control device for a bipedal mobile robot.

BACKGROUND ART

In recent years, a bipedal mobile robot, which has been planned to be in a practical use by the present applicants and the like, moves by an action for making two legs to alternately lift and land like a human. Further, in the present specification, "movement" of the bipedal mobile robot includes a movement from one place to another place, as well as such an action as turning almost in the same place to change orientation of the robot. In this turning action, a moving direction of the robot means a turning direction such as a clockwise direction and a counterclockwise direction. Additionally, "a stopped state" of the bipedal mobile robot is a state that the movement of the robot is not performed, so that a state with the two legs stopped as well as such a state as the robot is marching in the same place without changing orientation are included.

The present applicants attempt to establish a system for moving such a bipedal mobile robot by a remote controller having a manipulator lever such as a joystick. In this situation, for example, it is possible that a moving direction and a stride of the robot is determined in real time depending on a manipulating direction and a manipulation amount of a manipulator lever of a remote controller, thereby activating the legs of the robot according to these determined moving direction and stride.

However, in such a remote control device, when an attempt is made to move the robot to a desired position, the manipulator lever has to be operated by a manipulation amount corresponding to a moving amount from a current position to the desired position, but this manipulating amount is difficult to delicately adjust. Accordingly, for example, it is difficult to operate such a manipulator lever so that the robot is moved by a relatively minute amount (such a moving amount as a movement can be made by one step) from one place to another place and stopped. Additionally, even when a place to be reached last is known, the manipulation amount of the manipulator lever is difficult to accurately adjust while moving the robot toward the place, and as a result, it is difficult to make the robot reach the desired place.

In light of such a background, it is an object of the present invention to provide a remote control device that can surely move a bipedal mobile robot to a desired position by a relatively simple operation.

DISCLOSURE OF INVENTION

A remote control device for a bipedal mobile robot of the present invention is the remote control device for moving the bipedal mobile robot by an action for alternately lifting and landing two legs, and in order to achieve the above-mentioned object, there are three basic embodiments. A first embodiment is characterized by comprising a manipulator lever for commanding a moving direction of a bipedal mobile robot, moving amount setting means for counting a number of times that the manipulator lever is operated from a non-manipulation state to a manipulation state corresponding to a desired direction of the bipedal mobile robot until predetermined manipulation completing conditions are satisfied in a stopped state of the bipedal mobile robot and setting the moving amount of the bipedal mobile robot in the desired direction in correspondence with the counted number, and movement control means for making the bipedal mobile robot move toward the desired moving direction according to the set moving amount.

According to this first embodiment of the present invention, when an operator of the bipedal mobile robot attempts to move the robot toward the desired direction by the desired moving amount, the operator operates the manipulator lever into the manipulation state corresponding to the desired moving direction only for a number of times corresponding to the desired moving amount. At this time, moving amount setting means counts the number of operations of the manipulator lever to the manipulation state corresponding to the desired direction of the bipedal mobile, robot until the predetermined manipulation completing conditions for judging the above completion of the manipulator lever are satisfied, and thereby setting the moving amount of the bipedal mobile robot toward the desired direction depending on the counted number. The movement of the bipedal mobile robot toward the desired direction according to the set moving amount is then carried out by a control by the movement control means.

As just described, in the first embodiment of the present invention, the moving amount of the bipedal mobile robot toward the desired direction can be set according to the number of operations of the manipulator lever in the stopped state of the bipedal mobile robot, so that this setting may easily be performed. Consequently, the operation for moving the robot in the desired direction to the desired position may easily and surely be performed, so that the movement of the robot to the desired position may surely be performed by a simple operation. Further, the manipulation completing conditions include, for example, whether or not a confirmation switch provided beforehand in the remote control device is operated, or whether or not the manipulator lever is maintained in the non-manipulation state for more than a predetermined fixed period of time, etc.

In this first embodiment of the present invention, when there are multiple types of moving directions (for example, a forward/backward direction, a right/left direction, a turning direction of the robot, etc.) of the bipedal mobile robot to be commanded by the manipulator lever, the moving amount setting means counts the number of times the manipulator lever is operated into a manipulation state corresponding to a moving direction for each type of moving directions, and sets the moving amount of the bipedal mobile robot depending on the counted number of times for each type of the moving directions, and the movement control means combines the set moving amounts for each type of the moving directions to make the bipedal mobile robot move.

Accordingly, when an attempt is made to move the bipedal mobile robot to a desired position in any direction where the robot can move, the operator sets a required moving amount of the robot according to the number of operations of the manipulator lever for each type of moving direction that can be instructed by the manipulator lever, so that the moving amounts for each type of moving directions are combined by the movement control means to make the bipedal mobile robot move to the above desired position. Consequently, the operation for moving the bipedal mobile robot in any direction to the desired position may easily be carried out.

Subsequently, a second embodiment of the present invention is characterized by comprising a manipulator lever for commanding the moving direction of the bipedal mobile robot, moving amount setting means for clocking a time the manipulator lever is continuously maintained in a manipulation state corresponding to a desired direction of the bipedal mobile robot after a non-manipulation state until predetermined manipulation completing conditions are satisfied in a stopped state of the bipedal mobile robot, and setting a moving amount of the bipedal mobile robot toward the desired moving direction depending on the counted time, and movement control means for making the bipedal mobile robot move toward the desired moving direction according to the set moving amount.

According to this second embodiment of the present invention, when an operator of the bipedal mobile robot attempts to move the robot toward a desired direction by a desired moving amount, the operator continuously controls the manipulator lever into a manipulation state corresponding to the desired moving direction only for the time corresponding to the desired moving amount. At this time, moving amount setting means clocks a continuous operation time of the manipulator lever to the manipulation state corresponding to the desired direction of the bipedal mobile robot until the predetermined manipulation completing conditions for judging the above completion of the manipulator lever are satisfied, and thereby setting the moving amount of the bipedal mobile robot toward the desired direction depending on the counted time. The movement of the bipedal mobile robot toward the desired direction according to the set moving amount is then carried out by a control by the movement control means.

As just described, in the second embodiment of the present invention, the moving amount of the bipedal mobile robot toward the desired direction can be set according to the continuous operation time of the manipulator lever in the stopped state of the bipedal mobile robot, so that the operation for moving the robot in the desired direction to the desired position may easily and surely be performed as in the first embodiment, and the movement of the robot to the desired position may surely be performed by a simple operation. Further, the manipulation completing conditions include, for example, the same conditions as those in the first embodiment.

In this second embodiment of the present invention, when the operation to the operation state corresponding to the desired direction of the manipulator lever is performed multiple times, after the operation of the manipulator lever is started, until the manipulation completing conditions are satisfied, it is preferable that the moving amount setting means cumulatively clocks the time the manipulator lever is continuously maintained in the manipulation state, thereby setting the moving amount depending on the clocked time until the time the manipulation completing conditions are satisfied.

Accordingly, the moving amount toward the desired direction may be set by intermittently operating the manipulator lever while gradually changing thereof. Consequently, setting of the desired moving amount by the operation of the manipulator lever may easily be performed.

Furthermore, in the second embodiment of the present invention, it is preferable to further comprise information means for informing every time the moving amount corresponding to the clocked time changes by a predetermined moving amount with an increase in the clocked time during the operation of the manipulator lever. Accordingly, the operator will easily ascertain a corresponding relationship between a time of continuously operating the manipulator lever and a setting value of a moving amount of the robot according to the above reporting, so that the setting of the desired moving amount by the operation of the manipulator lever will be easy.

In addition, in the second embodiment of the present invention, there are multiple types of moving directions of the bipedal mobile robot that can be indicated by the manipulator lever, the moving amount setting means clocks the time the manipulator lever is continuously maintained in the manipulation state corresponding to the moving direction for each type of the moving directions, and sets the moving amount of the, bipedal mobile robot depending on the clocked time for each type of moving directions, and the movement control means combines the set moving amounts for each type of moving directions to make the bipedal mobile robot move.

Accordingly, the moving amounts for each type of moving directions to be set according to the operation time of the manipulator lever for each type of moving directions are combined by the moving amount setting means and the bipedal mobile robot is moved to the desired position obtained by this composition, so that the operation for moving the bipedal mobile robot in the desired direction to the desired position may easily be performed as in the first embodiment.

Subsequently, a third embodiment of the present invention is characterized by comprising a first manipulator lever having a manipulation state and a non-manipulation state commanding a moving direction of the bipedal mobile robot, a second manipulator lever that can variably be operated in response to a manipulation amount depending on a desired moving amount of the bipedal mobile robot and be maintained in a voluntary manipulation amount condition, moving amount setting means for setting the moving amount of the bipedal mobile robot toward the desired moving direction depending on the manipulation amount of the second manipulator lever when the first manipulator lever is operated into the manipulation state corresponding to the desired moving direction in a condition that the second manipulator lever is operated by the desired operation amount during a stopped state of the bipedal mobile robot, and movement control means for making the bipedal mobile robot move toward the desired moving direction by the set moving amount.

According to this third embodiment of the present invention, when an operator of the bipedal mobile robot attempts to move the robot toward the desired moving direction by the desired amount, the operator controls the second manipulator lever by the manipulation amount corresponding to the desired amount, thereby maintaining this manipulation amount. The operator then controls the first manipulator lever into the manipulation state corresponding to the desired moving direction in this condition. At this time, the moving amount setting means sets the moving amount of the bipedal mobile robot toward the desired moving direction depending on the manipulation amount of the second manipulator lever previously operated. The movement of the bipedal mobile robot toward the desired moving direction by the set moving amount is carried out by the control by the movement control means.

As just described, in the third embodiment of the present invention, the moving amount of the bipedal mobile robot toward the desired moving direction is set according to the manipulation amount of the second manipulator lever in a state that the bipedal mobile robot is stopped, and this second manipulator lever can be maintained in any manipulation amount state. In addition, the moving direction of the bipedal mobile robot is commanded by the operation of the first manipulator lever. Consequently, the operation for moving the robot in the desired direction to the desired position may easily and surely be performed, and the movement of the robot to the desired position may surely be carried out by a simple operation of the first and the second manipulator levers.

In this third embodiment of the present invention, there are multiple types of the moving directions of the bipedal mobile robot that can be commanded by the manipulator lever. The moving amount setting means sets the moving amount depending on the manipulation amount of the second manipulator lever for each type of moving direction, and the movement control means combines the set moving amounts for each type of moving directions to make the bipedal mobile robot move.

Accordingly, the moving amounts set according to the manipulation amount of the second manipulator lever for each type of moving direction indicated by the first manipulator lever are combined by the movement control means and the bipedal mobile robot is moved to the desired position obtained according to this composition, so that the operation for moving the bipedal mobile robot in any direction toward the desired position may easily be performed as in the first embodiment.

In each embodiment of the present invention as described above, it is preferable to further comprise indicating means for indicating post-movement position information showing a moved position from the current position of the bipedal mobile robot based on the moving amount set by the moving amount setting means before the bipedal mobile robot starts moving by the movement control means. Accordingly, the operator can confirm the position after the robot is moved according to the post-movement position information before the bipedal mobile robot starts moving, so that setting of the moving amount by the operation of the manipulator lever can be corrected as needed.

Additionally, in each embodiment of the present invention, the moving amount set by the moving amount setting means comprises a moving amount the bipedal mobile robot can be moved by alternately lifting and landing each leg of the bipedal mobile robot. When the movement control means makes the bipedal mobile robot move, in a state that a foot of either one of the two legs of the bipedal mobile robot is landed, a foot of the other leg is landed on the position moved by the moving amount set by the moving amount setting means toward the desired moving direction with respect to the foot of the one leg, and then in a state that the foot of the other leg is landed, the foot of the one leg is moved to a position where the foot thereof is arranged in parallel with the foot of the other leg, thereby making the bipedal mobile robot move.

According to this, the moving amount set by the moving amount setting means is a moving amount that the bipedal mobile robot can be moved by alternately lifting/landing each leg of the bipedal mobile robot once at a time. The foot of the leg lifted and landed first (the other leg) is moved by the moving amount in the desired moving direction relative to the foot of the leg on a supporting leg side (the one leg), and both the feet of both legs will be arranged in parallel by a succeeding lifting/landing action (a lifting/landing action of the one leg). Accordingly, the movement of the bipedal mobile robot by a relatively small moving amount may surely be carried out.

The present invention, that the moving amount set by the moving amount setting means is determined to be relatively small as described above, further comprises means for setting an open-legged-stop mode for making the bipedal mobile robot stop with the legs opened by a predetermined operation after the bipedal mobile robot is moved, and when the open-legged-stop mode is set, in a state that the foot of either one of the two legs of the bipedal mobile robot is landed, the movement control means stops both the legs after the other leg is landed on a position that the other leg is moved toward the desired moving direction by the moving amount with respect to the foot of the one leg.

Accordingly, when the operator of the bipedal mobile robot sets the open legged stop mode by the predetermined operation (switch operation, etc.), only the foot of the one leg is lifted and landed, the foot of the one leg is moved in the desired moving direction by the set moving amount to land, so that the two legs will be stopped in such a state. Consequently, the open legged stop of the bipedal mobile robot (stop in a state that a space between the feet is widened) may be carried out as needed.

Additionally, in each embodiment of the present invention, the moving amount set by the moving amount setting means may be a relatively large moving amount that the bipedal mobile robot can be moved for multiple steps of a moving action. In this situation, when the movement control means makes the bipedal mobile robot move, the movement control means determines a number of walking steps of the bipedal mobile robot depending on the moving amount toward the desired moving direction set by the moving amount setting means, and performs lifting and landing of each leg of the bipedal mobile robot by the determined walking steps and, at the last walking step, has the foot of the leg to be lifted and landed to a position where the foot thereof is arranged in parallel with the foot of the leg on the supporting leg side, thereby moving the bipedal mobile robot.

Accordingly, a number of walking steps is determined depending on the set moving amount toward the desired moving direction, and consequently a proper number of walking steps, which stability of a posture of the bipedal mobile robot for each step can be ensured, may be determined. Each leg, is lifted and landed for the determined steps to move the bipedal mobile robot, and particularly at the last walking step, the foot of the leg (leg on a free leg side) to be lifted and landed is arranged in parallel with the foot of the leg on the supporting leg side, so that the bipedal mobile robot may surely be moved by the set moving amount toward the desired direction in a steady posture of the robot.

Moreover, in each embodiment of the present invention, as noted above, the movement of the bipedal mobile robot with the relatively small moving amount given by one lifting/landing action for each leg and the movement of the bipedal mobile robot with the relatively large moving amount given by the multiple walking steps of the moving action may also selectively be carried out by the operation of the remote control device. In this situation, the remote control device is provided with means for selecting (e.g. mode selecting switch), by a predetermined operation, a first movement mode for setting a moving amount wherein the bipedal mobile robot can be moved by alternately lifting and landing each leg of the bipedal mobile robot with the moving amount setting means, and a second movement mode for setting a moving amount wherein the bipedal mobile robot can be moved by the multiple walking steps of the moving action with the moving amount setting means. When the bipedal mobile robot is moved in a state that the first movement mode is selected (at this point, the moving amount, set by the moving amount setting means will be relatively small), just as the above, in a state the foot of either one of the two legs of the bipedal mobile robot is landed, the movement control means lands the foot of the other leg with respect to the foot of the one leg on a position where the foot thereof is moved by the moving amount, which is set by the moving amount setting means corresponding to the first movement mode, in the desired moving direction, then in a state that the foot of the other leg is landed, the foot of the one leg is moved to the position where the foot thereof is arranged in parallel with the foot of the other leg, and consequently, the bipedal mobile robot is moved. In the same manner, when the bipedal mobile robot is moved in a state that the second movement mode is selected (at this point, the moving amount set by the moving amount setting means will be relatively large), the movement control means determines a number of walking steps of the bipedal mobile robot depending on the moving amount toward the desired moving direction set by the moving amount setting means corresponding to the second movement mode, performing lifting/landing of each leg of the bipedal mobile robot by the determined number of walking steps and the foot of the leg to be lifted and landed to move to a position where the foot thereof is arranged in parallel with the foot of the leg on the supporting leg side at the last walking step, and consequently, the bipedal mobile robot is moved.

According to this attempt, the movement of the bipedal mobile robot by a relatively small moving amount toward a desired direction and the movement by a relatively large moving amount toward a desired direction may selectively be carried out using one remote control device, thereby enabling to improve operability for moving the robot by the remote control device. Furthermore, a scale of the setting value of the moving amount given by the moving amount setting means is arranged to correspond to and vary depending on each movement mode, so that an operation pattern of manipulator lever does not need to vary from one movement mode to the other movement mode and the movement of the robot in two types of movement modes may easily and selectively be carried out.

BEST MODE OF CARRYING OUT THE INVENTION

Referring to FIGS. 1 through 12, a first embodiment of the present invention is described. The present embodiment is one embodiment of the first embodiment of the present invention.

Figure 1:
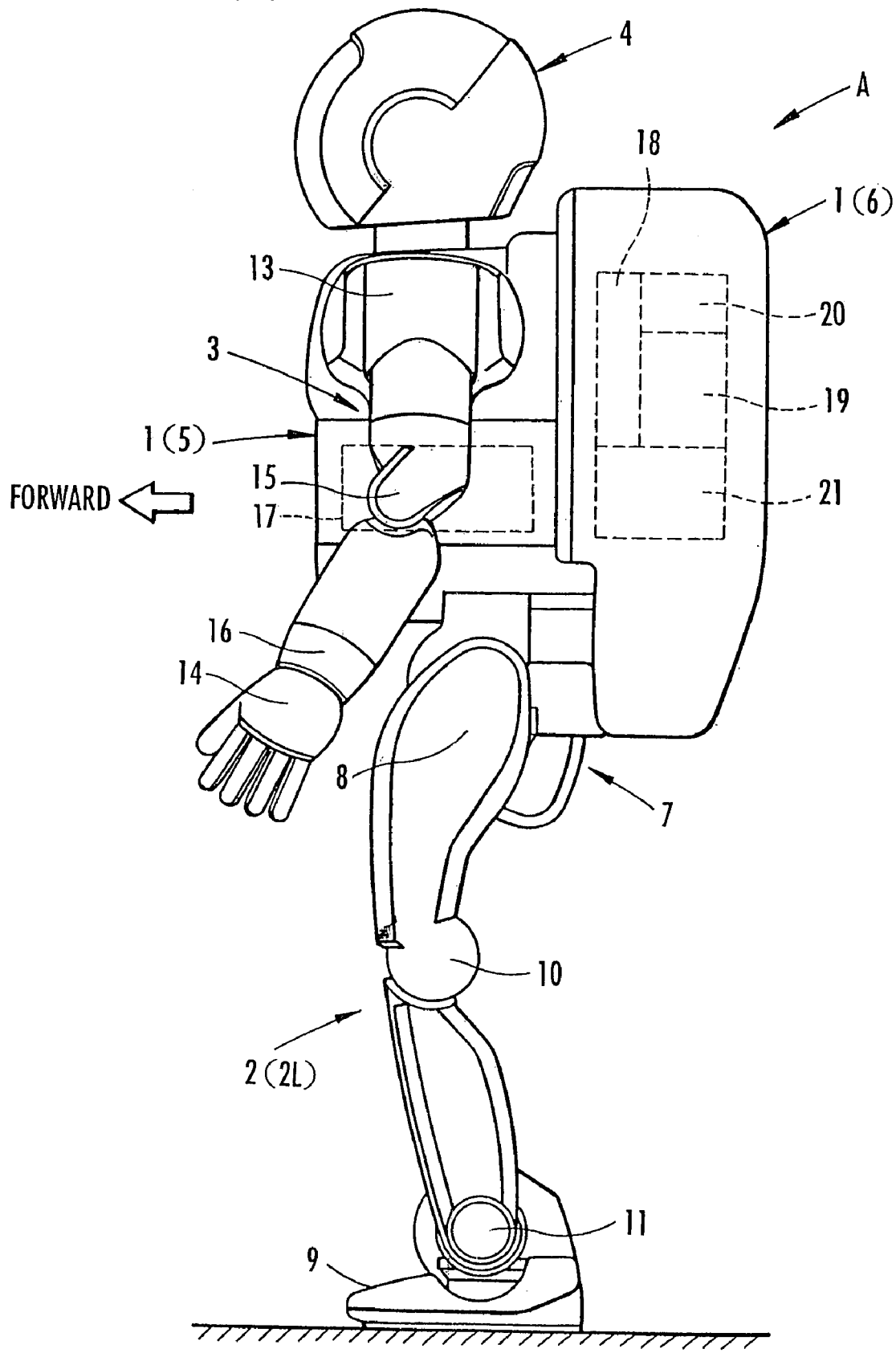
FIG. 1 is a side view of a bipedal mobile robot operated in an embodiment of the present invention.

Referring to FIG. 1, a bipedal mobile robot A in the present embodiment is a humanoid robot comprising an upper body 1 (torso), legs 2, arms 3 and a head 4. Furthermore, FIG. 1 is a side view of the robot A, so that only one of the legs 2 and the arms 3 are described, respectively, but the legs 2 and the arms 3 are provided by a pair (two), respectively. The leg 2 and the arm 3 shown in FIG. 1 indicate the leg 2 and the arm 3 on the left side of the robot A facing forward. The upper body 1 of this robot A comprises a main body 5 having the legs 2 and the arms 3 extendedly provided therefrom and supporting a head 4, and a case-like sub body 6 attached to a rear portion of the main body 5 designed to be carried on the back of this main body 5.

A waist 7 is formed on the lower portion of the main body 5, and each leg 2 is extendedly provided from a right/left pair of hip joints 8 provided on the waist 7, respectively. Each leg 2 has a knee joint 10 and an ankle joint 11 in order from the side of the hip joint 8 between its foot 9 and the hip joint 8. In this case, the hip joint 8 is adapted to be capable of rotary motions about three axes in an upward/downward direction, a right/left direction, and a forward/backward direction, the knee joint 10 is adapted to be capable of a rotary motion about one axis in the right/left direction, and the ankle joint 11 is adapted to be capable of rotary motions in two axes in the forward/backward direction and the right/left direction. Accordingly, each leg 2 is adapted to be capable of performing a movement almost the same as a human leg.

A shoulder joint 13 is provided on each side of the upper portion of the main body 5, and each arm 3 is extendedly disposed from the shoulder joint 13 on each side. Each arm 3 has an elbow joint 15 and a wrist joint 16 in order from the side of the shoulder joint 13 between its hand portion 14 and a shoulder joint 13. Furthermore, the shoulder joint 13, the elbow joint 15 and the wrist joint 16 are adapted to be capable of rotary motions about three axes, one axis, and one axis, respectively, and capable of making each arm 3 to perform a motion similar to a motion of a human arm.

Further, each joint of each leg 2 and each arm 3 are designed to be driven by an electric motor (not shown). Additionally, the head 4 is supported by the upper portion of the main body 5, and an imaging device (not shown) for vision of the robot A is built in its interior portion.

The main body 5 is mounted with a battery 17 as an electric source for a motion of the robot A. Moreover, the sub body 6 accommodates a driver circuit unit 18 of an electric motor (not shown) for driving each joint of each leg 2 and each arm 3, a control unit 19 (hereinafter referred to as ECU 19) for taking charge of a motion control of the robot A (an operation control for each joint of the leg 2 and the arm 3), a communication system 20 for transmitting/receiving various information between the ECU 19 and a remote control device 22 to be described later, and a DC/DC converter 21 for converting an output voltage level of the battery 17 into a level such as a level for operating the ECU 19 and the like. In this case, the ECU 19 is configured with an electric circuit including a microcomputer or the like, and is equivalent to movement control means in the present invention. In addition, the communication system 20 conducts wireless communications in the present embodiment.

Further, in the following description, in order to distinguish between the right leg 2 and the left leg 2, a right side leg 2 may be referred to as a right leg 2R and a left side leg 2 may be referred to as a left leg 2L in a direction that the robot A faces forward.

Figure 2:
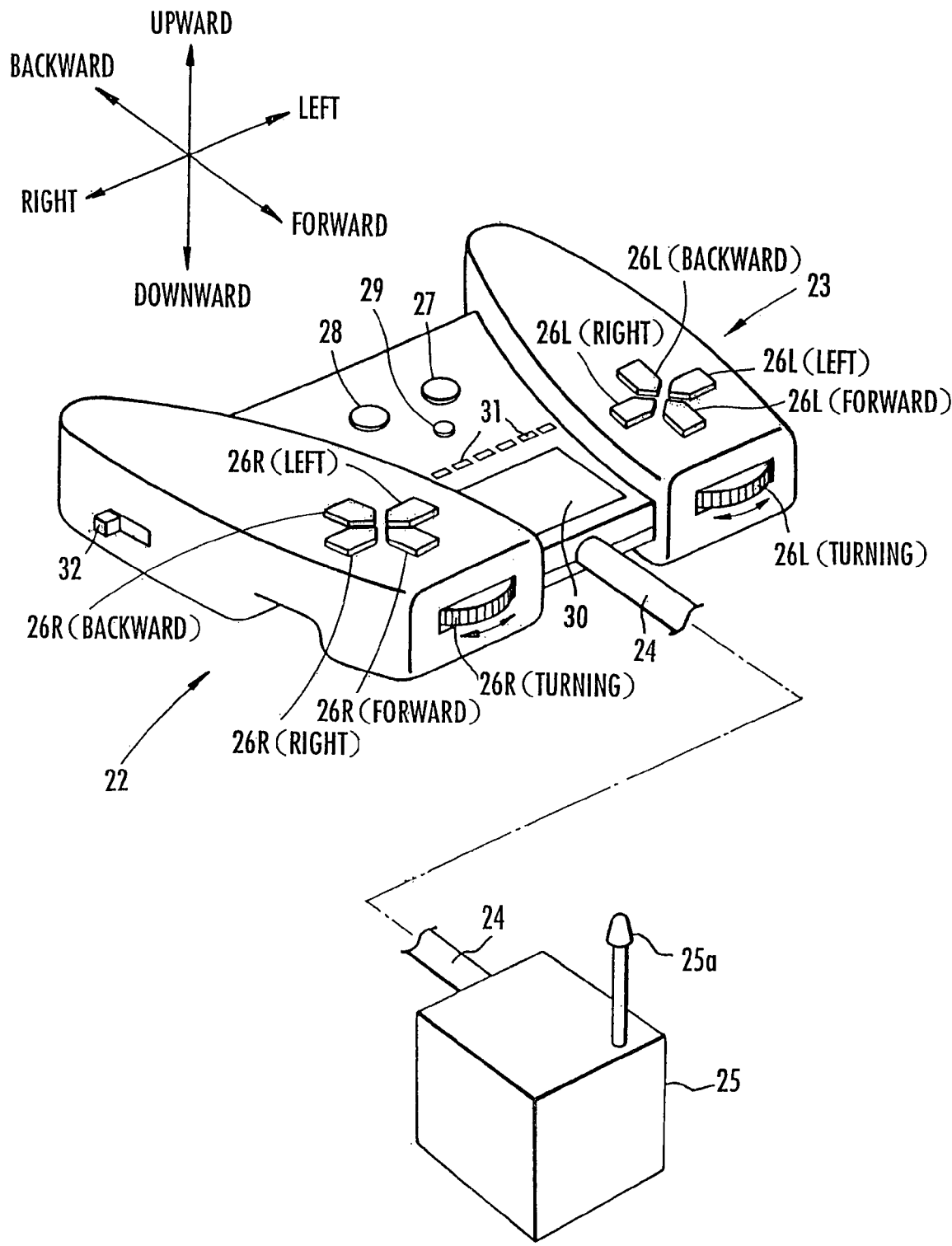
FIG. 2 is a perspective view showing a remote control device in a first embodiment of the present invention.

A main configuration of the remote control device 22 of the present invention for operating a remote control of a moving action by the leg 2 of the afore-mentioned bipedal mobile robot A is shown in FIG. 2. As shown in FIG. 2, the remote control device 22 comprises a manipulator 23 that an operator (an operator of the robot A) holds to operate, and a communication system 25 connected to the manipulator 23 through a cable 24. At this point, the communication system 25 collaborates and mediates with the communication system 20 of the robot A to transmit/receive information between the manipulator 23 and the ECU 19 of the robot A, resulting in conducting a communication with the communication system 20 of the robot A through an antenna 25a by radio.

The manipulator 23 comprises a plurality of manipulator levers (10) for performing a commanding operation of a moving direction and a moving amount which the robot A desires: 26L(forward); 26L(backward); 26L(left); 26L(right); 26L(turning); 26R(forward); 26R(backward); 26R(left); 26R(right); and 26L(turning)(hereinafter may be referred to as manipulator levers 26 generically, when these manipulator levers do not particularly require to be differentiated). Among these manipulator levers 26, the manipulator lever 26L(forward), 26R(forward) are manipulator levers for moving the robot A toward the front, the manipulator lever 26L(backward), 26R(backward) are manipulator levers for moving the robot A toward the back, the manipulator lever 26L(left), 26R(left) are manipulator levers for moving the robot A toward the left, the manipulator lever 26L(right), 26R(right) are manipulator levers for moving the robot A toward the right, and 26L(turning), 26R(turning) are manipulator levers for rotating the robot A clockwise or counterclockwise.

In this situation, among these manipulator levers 26, the manipulator levers excluding the manipulator levers 26L (turning), 26R (turning) are a button switch type, respectively, so that these manipulator levers are in an ON state only in an operated state that these manipulator levers are pressed, and in an OFF state in a normal state (a non-operation state) that these manipulator levers are not pressed. Additionally, the manipulator levers 26L (turning), 26R (turning) are dial style manipulator levers rotatably about an axis in a vertical direction in both directions of a clockwise and a counterclockwise rotations, respectively, so that these manipulator levers are energized by a spring (not shown) which is in a predetermined neutral rotational position in the normal-state (non-operation state).

In addition, among the manipulator levers 26, the manipulator levers 26L (forward), 26L (backward), 26L (left), 26L (right), and 26L (turning) are the manipulator levers for moving the left leg 2L particularly when the robot A is stopped with legs opened as will be described later. These manipulator levers are provided on a left side portion of the manipulator 23 facing forward. In this case, the manipulator levers 26L (forward), 26L (backward), 26L (left), and 26L (right) are disposed in a cross shape in four directions on a surface of a leftward portion of the manipulator 23, respectively, and the manipulator lever 26L (turning) is disposed on a front end surface portion of the leftward portion of the manipulator 23 with a portion of a periphery surface portion of the manipulator lever 26L (turning) exposed (hereinafter may be referred to as left-manipulator levers 26L generically, when the manipulator, levers 26L (forward), 26L (backward), 26L (left), 26L (right), and 26L (turning) do not particularly need to be distinguished).

Additionally, the manipulator levers 26R (forward), 26R (backward), 26R (left), 26R (right), and 26R (turning) other than the above-mentioned left-manipulator levers 26L are the manipulator levers for moving the right leg 2R particularly when the robot A is stopped with the legs opened as will be described later. These manipulator levers 26R (forward), 26R (backward), 26R (left), 26R (right), and 26R (turning) are provided on a right side portion of the manipulator 23, and disposed on the surface on a rightward portion and the front edge portion of the manipulator 23 as with the left-manipulator levers 26L (hereinafter, the manipulator levers 26R (forward), 26R (backward), 26R (left), 26R (right), and 26R (turning) may be referred to as right-manipulators 26R as with the case of the left-manipulators 26L).

Further, according to the following description, in regard to each manipulator lever of the left-manipulator levers 26L and each manipulator lever of the right-manipulator levers 26R, when it is not necessary to distinguish between right and left, symbols of "R" and "L" may be omitted and referred to as the manipulator levers 26 (forward), 26 (backward), 26 (left), 26 (right), and 26 (turning).

The manipulator 23 comprises a plurality of the manipulator levers 26 as described above, and further comprises a confirmation switch 27 for confirming an after-mentioned commanding operation for a moving direction and a moving amount of the robot A by the manipulator levers 26 on a center portion of a surface thereof, a cancellation switch 28 for canceling the command for the moving direction and the moving amount, an opened-legs-stop ON/OFF switch 29 for commanding whether or not to stop the robot A with the legs opened after a movement as will be described later, a liquid crystal display 30 for showing a post-movement position information indicating to which movement position the robot A moves from a current position according to the moving direction and the moving amount of the robot A determined by manipulating the manipulator levers 26, and a plurality of LED lamps 31 as information means for informing a change of the moving amount set in each moving direction (a forward/backward direction, a right/left direction, and a turning direction in the present embodiment) of the robot A corresponding to each manipulator lever 26 during the operation. Moreover, on a side surface portion of the manipulator 23, a movement mode selecting switch 32 for selectively specifying a movement mode of the robot A depending on an operation of the manipulator 23 is provided. In this situation, in the present embodiment, the confirmation switch 27, the cancellation switch 28, and the opened-legs-stop ON/OFF switch 29 are press-button switch type that an ON state is made by a press-operation as the same with the manipulator levers 26(forward), 26(backward), 26(left), and 26(right), and the movement mode selecting switch 32 is a two-position changer switch which may take two operating positions. In addition, the plurality of LED lamps 31 are provided in parallel in a right/left direction of the manipulator 23.

At this point, in the present embodiment, a selectable movement mode by the movement mode selecting switch 32 has a minor movement mode for moving the robot A a relatively small movement amount, which can move the robot A by alternately performing a lifting/landing action for two legs 2, 2 of the robot A one at a time, and a major movement mode for moving the robot A a relatively large amount, which may need to alternately perform the lifting/landing action for the two legs 2, 2 of the robot A for multiple times (perform the movement operation of the robot A for multiple times). The minor movement mode and the major movement mode are equivalent to a first movement mode and a second movement in the present invention, respectively.

Figure 3:
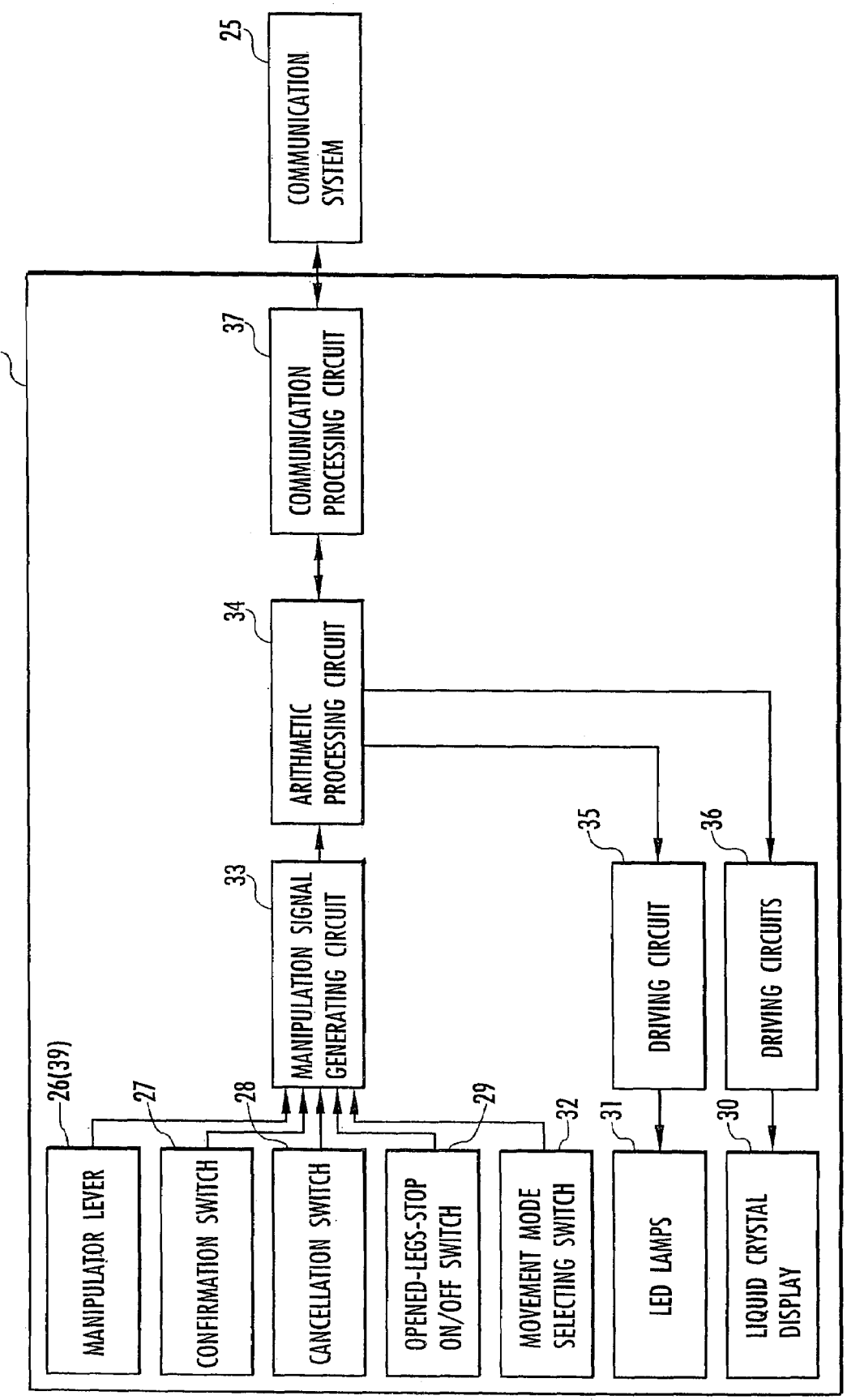
FIG. 3 is a block diagram showing a circuitry of a manipulator of the remote control device in FIG. 2.

Referring to the block diagram of FIG. 3, the manipulator 23 is provided with a manipulation signal generating circuit 33 for generating a signal in response to respective operation states of each of the aforementioned manipulator lever 26, the confirmation switch 27, the cancellation switch 28, the opened-legs-stop ON/OFF switch 29, and the movement mode selecting switch 32, an arithmetic processing circuit 34 in which the manipulation signal is input, driving circuits 35, 36 for driving the LED lamps 31 and the liquid crystal display 30, respectively, and a communication processing circuit 37 for taking charge of transmitting/receiving signal data between the arithmetic processing circuit 34 and the communication system 25, in the interior portion thereof. Further, a parenthesized reference numeral (39) regarding to the manipulator levers is a reference numeral with regard to a description of a fourth embodiment to be described later.

In this situation, regarding each manipulator levers 26 other than the manipulator lever 26(turning), the confirmation switch 27, the cancellation switch 28, and the opened-legs-stop ON/OFF switch 29, the manipulation signal generating circuit 33 generates a signal for indicating whether or not these switches are in the ON state. In addition, regarding each manipulator lever 26(turning), the manipulation signal generating circuit 33 generates respective different signals when the manipulator lever is operated to rotate more than a predetermined amount in a clockwise direction from a neutral rotational position, and when the manipulator lever is operated to rotate more than a predetermined amount in a counterclockwise direction. In other words, a signal for indicating which direction each manipulator lever 26(turning) is operated to turn, the clockwise direction or the counterclockwise is generated.

In addition, the arithmetic processing circuit 34 is a circuit including a CPU that executes a processing for setting a moving amount of the robot A in response to the manipulation signal input from the manipulation signal generating circuit 33 as will be described later, a processing for outputting moving instruction data which comprises the set data, data of a manipulation state for the opened-legs-stop ON/OFF switch 29 and the movement mode selecting switch 32, or the like, to the communication system 25 through the communication processing circuit 37, a processing for controlling indications of the LED lamps 31 and the liquid crystal display 30 through the driving circuits 35, 36 as will be described later. Further, this arithmetic processing circuit 34 is equivalent to moving amount setting means in the present invention.

Next, an actuation of the present embodiment is described. First, a case, which the movement mode selecting switch 32 is operated to the minor movement mode and the opened-legs-stop ON/OFF switch 29 is in the OFF state, is described. In addition, it is assumed that the robot A is stopped in a closed state with feet 9, 9 of the two legs 2, 2 opened in parallel having a predetermined space in the right/left direction (not moving). In this situation, the feet 9, 9 of the two legs 2, 2 may be alternately lifted and landed in the same place to be marched in place.

Figure 4:
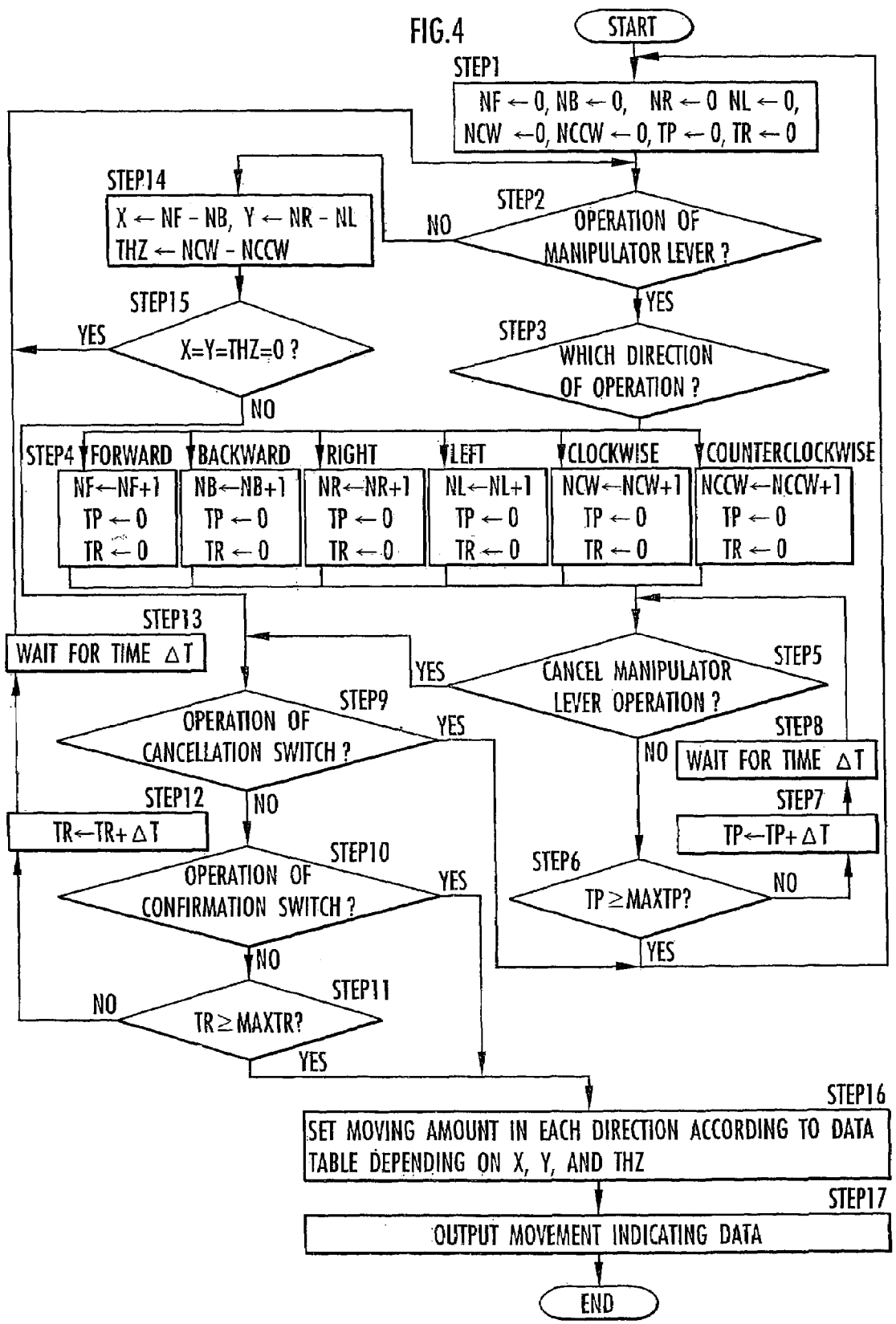
FIG. 4 is a flowchart describing a processing in the manipulator of the remote control device in FIG. 2.

In such a condition, the arithmetic processing circuit 34 of the manipulator 23 executes a processing as shown in the flowchart of FIG. 4.

The arithmetic processing circuit 34 is first initialized to have values for various variables NF, NB, NR, NL, NCW, NCCW, TP, and TR to be "0", in STEP 1. At this point, the variables NF, NB, NR, and NL are variables for counting the number of times that the manipulator levers 26(forward), the manipulator levers 26(backward), the manipulator levers 26(right), and the manipulator levers 26(left) are pressed to be operated, respectively. Additionally, the variables NCW, NCCW are variables for counting the number of times that the manipulator levers 26(turning) are operated in the clockwise direction and in the counterclockwise direction, respectively (hereinafter, the variables NE, NB, NR, NL, NCW, and NCCW are referred as operation number variables). In addition, the variable TP is a variable for clocking time that one manipulator lever 26 is continuously operated (however, regarding to each manipulator 26(turning), for time that it is continuously operated in a same turning direction), and the variable TR is a variable for clocking continuation time in a state that none of the manipulator levers 26 is operated (hereinafter, the variables TP, TR are referred to as time variables).

Subsequently, the Arithmetic processing circuit 34 judges whether or not any manipulator 26 is operated based on an output of the manipulation signal generating circuit 33 (STEP 2). When any one of the manipulators 26 is operated, the arithmetic processing circuit 34 judges which manipulator lever 26 is operated and which moving direction of the robot A this manipulator lever 26 corresponds to (STEP 3), a value for the operation number variable NF, NB, NR, NL, NCW, or NCCW corresponding to the judged direction is increased by "1" (STEP 4). Additionally, in this STEP 4, the values of the respective time variables TP, TR are initialized to be "0". Further, in STEP 4, the value for the operation number variable NF is increased even when either of the left and right-manipulator levers 26L (forward), 26R (forward) is operated, and this is the same as where the operation number variables NB, NR, and NL are concerned. Furthermore, the value for the operation number variable NCW is increased even when either of the left and right-manipulator levers 26L (turning), 26R (turning) is operated in the clockwise direction, and this is the same as where the operation number variable NCCW is concerned.

Following the processing of the above STEP 4, the arithmetic processing circuit 34 judges whether or not the operation of the manipulation levers 26 is released (STEP 5), and judges whether or not a current value for the time variable TP reaches the predetermined maximum time MAXTP when the operation of the manipulation levers 26 continues (STEP 6). At this point, when TP≧MAXTP is given, the arithmetic processing circuit 34 assumes that the operation of the manipulator 26 which the robot A has been moved up to now is cancelled, and the processing of the aforementioned STEP 1 is executed to initialize the values for the operation number variables NF, NB, NR, NL, NCW, and NCCW and the time variables TP, TR to be "0". In addition, when TP<MAXTP is given in STEP 6, after the arithmetic processing circuit 34 increases the value for the time variable TP by a predetermined time length ΔT (STEP 7), waits for the time of the time length ΔT (STEP 8), and then, returns to the judgment processing of STEP 5. According to a loop processing of STEP 5 through STEP 8, when either of the manipulator levers 26 is continuously operated more than the aforementioned maximum time MAXTP; the operation of the manipulators 26 for moving the robot A up to now wilt be cancelled.

On the other hand, according to a judgment of the aforementioned STEP 5, when the operation of the manipulator lever 26 is released before a continuous operation time of the manipulator lever 26 reaches the maximum time MAXTP, then the arithmetic processing circuit 34 judges whether or not the cancellation switch 28 has been operated (STEP 9). When the cancellation switch 28 is operated, the arithmetic processing circuit 34 executes the initialization processing of STEP 1 in the same manner when the judgment result of STEP 6 is YES. Additionally, when the cancellation switch 28 is operated in STEP 9, the arithmetic processing circuit 34, further judges whether or not the confirmation switch 27 is operated (STEP 10). At this point, when the operation of the confirmation switch 27 is confirmed, the arithmetic processing circuit 34 assumes that the operation of the manipulator lever 26 for moving the robot A is completed, resulting in executing a processing in STEP 16 to be mentioned later, and when the confirmation switch 27 is not operated, furthermore, the arithmetic processing circuit 34 judges whether or not a current value of the time variable TR further reaches a predetermined maximum MAXTR (STEP 11). At this point, when TR<MAXTR is given, after a value for the time variable TR is increased by a predetermined time length ΔT (STEP 12), the arithmetic processing circuit 34 waits for the time of the time length ΔT (STEP 13) and then, executes the judgment processing of STEP 2 (a processing for judging whether or not the manipulator 26 is operated).

When none of the manipulator levers 26 is operated according to the judgment of STEP 2, the arithmetic processing circuit 34 calculates a deviation X=NF−NB of the vales for the operation number variables NF, NB with respect to the movement in a forward/backward direction of the robot A (hereinafter referred to as a forward/backward number variable X), a deviation Y=NR−NL of the values for the operation number variables NR, NL with respect to the movement in a right/left direction of the robot A (hereinafter referred to as a right/left number variable Y), and a deviation THZ=NCW−NCCW of the values for the operation number variables NCW, NCCW with respect to the rotational movement of the robot A (hereinafter referred to as a turning number variable THZ) (STEP 14). When the arithmetic processing circuit 34 judges whether or not all of the forward/backward number variable X, the right/left number variable Y, and the turning number variable THZ are "0" (STEP 15), and executes the judgment processing of STEP 2 when X=Y=THZ=0 is given. Additionally, when any of X, Y, and THZ is not "0", the judgment processing of STEP 9 (judging whether or not the cancellation switch 28 is operated) is executed.

When TR≧MAXTR is given according to the judgment of STEP 11, in other words, when an elapsed time after the manipulator lever 26 is operated at the last has reached the maximum time MAXTR without operating the cancellation switch 28, the confirmation switch 27 and the manipulator lever 26 (but, except when X=Y=THZ=0 is given), the arithmetic processing circuit 34 assumes that the operation of the manipulator lever 26 for moving the robot A is completed in the same manner when the operation of the confirmation switch 27 is confirmed in the aforementioned STEP 10, resulting in executing a processing of STEP 16 to be described below.

In this STEP 16, according to the values for the forward/backward number variable X, the right/left number variable Y, and the turning number variable THZ, the arithmetic processing circuit 34 sets a moving amount in the forward/backward direction, a moving amount in the right/left direction, and a moving amount in a turning direction (rotating amount) of the robot A based on a predetermined data table with respect to respective variables for these values. At this point, the data table is particularly provided to every type of movement modes (the minor movement mode or the major movement mode) of the robot A selected by the movement mode selecting switch 32, so that the data table for this minor movement mode is used in STEP 16 in a state that the minor movement mode is selected.

In this case, a moving amount in each direction of the robot A which is set according to the data table for the minor movement mode is a relatively small moving amount (for example, an order of centimeters) that the robot A can be moved by alternately performing a lifting/landing action for the two legs 2, 2 of the robot A one at a time. In the present embodiment, a moving amount in each direction of the robot A is set to a value proportional to the respective values of the corresponding number variables X, Y, and THZ. At this point, when a moving amount in the forward/backward direction1 which is set in response to the value for the forward/backward number variable X (=NF−NB), is X>0, it is a moving amount toward the front, and when it is X<0, it is a moving amount toward the back. Additionally, when a moving amount in the right/left direction, which is set in response to the value for the right/left number variable Y (=NR−NL), is Y>0, it is a moving amount toward the right, and when it is Y<0, it is a moving amount toward the left. In addition, when a moving amount in the turning direction, which is set in response to the value for the turning number variable THZ (=NCW−NCCW) is THZ>0, it is a rotational amount in the clockwise direction, and when it is THZ<0, it is a rotational amount in the counterclockwise direction. Further, when any value for the number variables X, Y, and THZ is "0", the moving amount in a direction corresponding to the number variable with "0" is also "0".

In this manner, a moving amount in each direction of the forward/backward, the right/left, and the turning directions of the robot A is set in response to the values for the number variables X, Y, and THZ corresponding to these respective directions, and resultingly, the moving amount in each direction will be set depending on the operation numbers of the manipulator levers 26 corresponding to the respective directions.

Further, in the present embodiment, the moving amount in each direction of the robot. A is set proportional to the corresponding value of the number variables X, Y, and THZ, but basically, the moving amount may be set in a manner that as absolute values for the values of the number variables X, Y, and THZ increase, the moving amounts of the corresponding directions increase. For example, the degree of an increase in a moving amount may be changed depending on the degree of absolute values of the number variable X, Y, and THZ.

After the amount in each direction of the forward/backward, the right/left, and the turning directions is set as noted above, the arithmetic processing circuit 34 outputs movement commanding data including setting data of the moving amount for each direction and respective operational state data of the opened-legs-stop ON/OFF switch 29 and the movement mode selecting switch 32 through the communication processing circuit 37 to the communication system 25 (STEP 17). Further, in the present embodiment, the arithmetic processing circuit 34 is adapted to store data for indicating either the manipulator lever 26 first operated in the aforementioned STEP 2 is one of the left-manipulator levers 26L or one of the right-manipulator levers 26R (hereinafter referred to as right/left manipulation distinguishing data), and output the right/left manipulation distinguishing data with the movement commanding data. Additionally, after the output of the movement commanding data or the like is completed, or after an after-mentioned actual movement of the robot A based on the movement commanding data or the like is completed, the processing of the arithmetic processing circuit 34 goes back to "START" in FIG. 4.

In addition, though a description is not shown in the flowchart in FIG. 4, for every operation of one manipulator lever 26, the arithmetic processing circuit 34 of the manipulator 23 temporarily lights the LED lamps 31 depending on the value for the operation number variable NF, NB, NR, NL, NCW, or NCCW updated according to the operation. In this situation, for example, the LED lamps 31 are lit up in a manner that a number of the lit-up LED lamps increases from one end of a layout of the LED lamps toward the other end, as the values for respective operation number variables NF, NB, NR, NL, NCW, and NCCW increase. Accordingly, an operator can schematically recognize the operation number of the manipulator lever 26 corresponding to a desired moving direction of the robot A and then the setting value of the moving amount to the moving direction. Further, for every operation of the manipulator 26, respective values of the operation number variables NF, NB, NR, NL, NCW, and NCCW may be indicated on the liquid crystal display 30 or the like.

Moreover, every time the manipulator lever 26 is operated to update the values for the operation number variables NF, NB, NR, NL, NCW, and NCCW the arithmetic processing circuit 34 determines a moving amount of the robot A in each direction of the forward/backward, the right/left, and the turning directions according to the data table used in the aforementioned STEP 16 depending on the forward/backward number variable X, the right/left number variable Y, and the turning number variable THZ determined according to the values for the operation number variables NF, NB, NR, NL, NCW, and NCCW. The arithmetic processing circuit 34 makes the liquid crystal display 30 to indicate as follows based on the determined moving amount in each direction.

Figure 5:
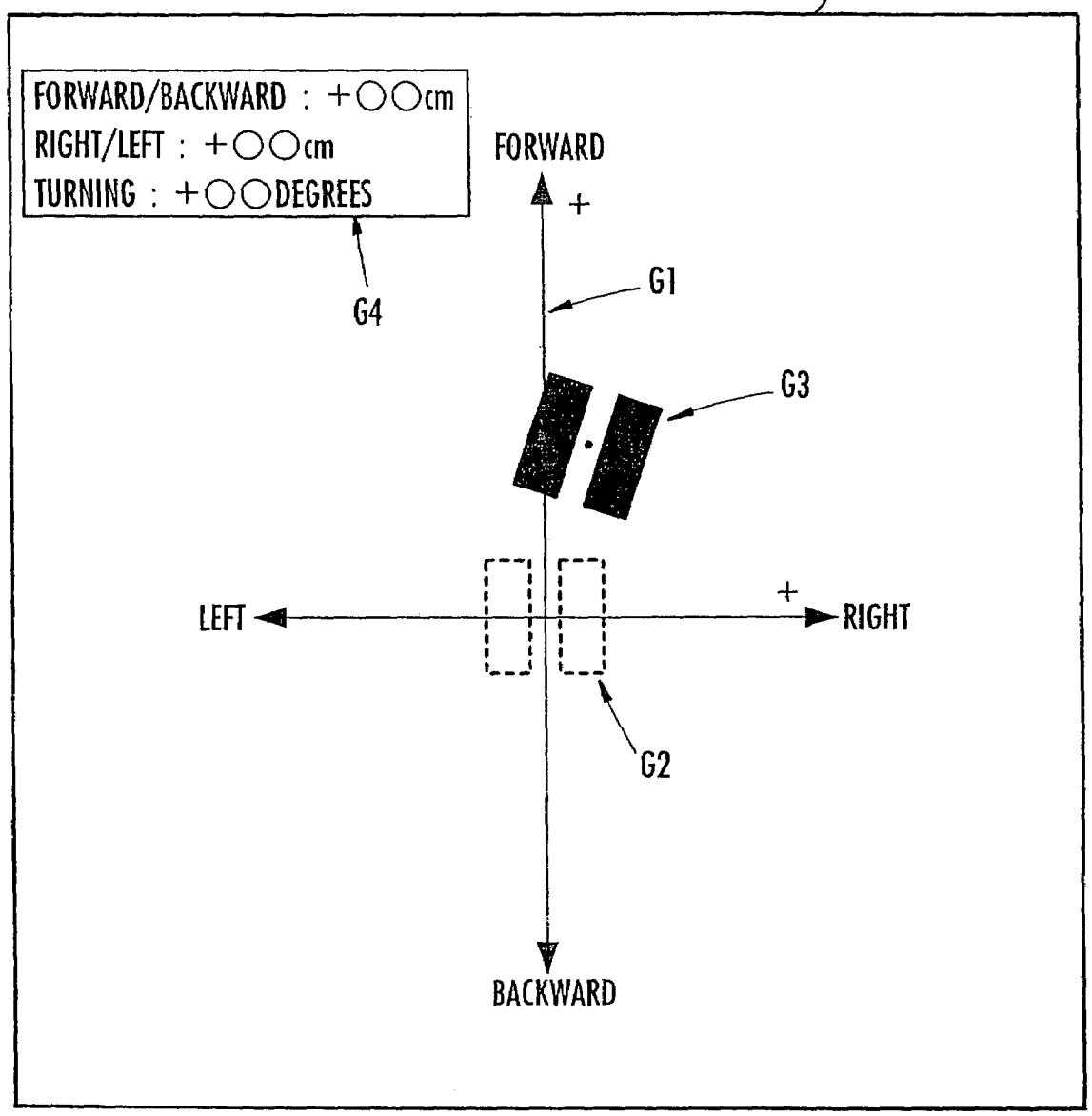
FIG. 5 is an illustration showing a displayed description of a liquid crystal display of the manipulator of the remote control device in FIG. 2.
Figure 6:
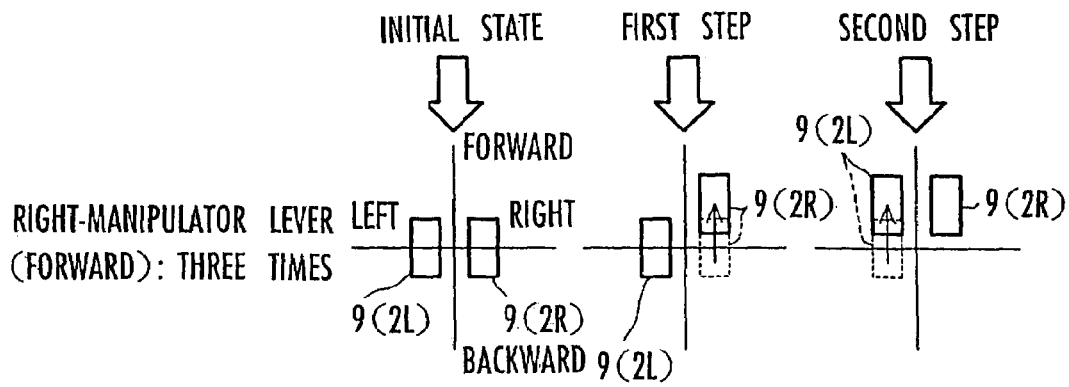
FIGS. 6 through 12 are explanatory diagrams exemplifying moving patterns of the robot in the first embodiment of the present invention.
Figure 6:
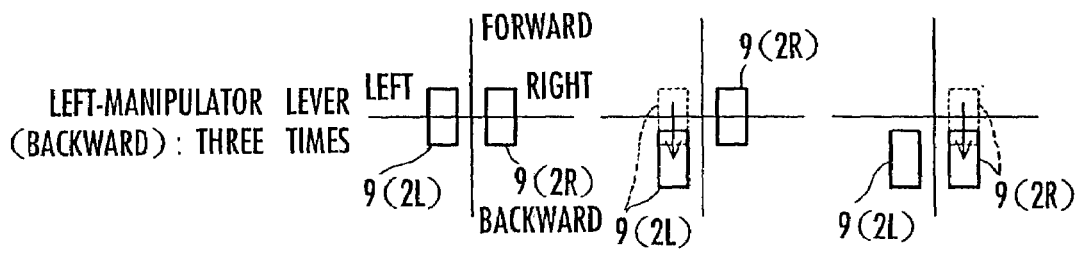
Figure 6:
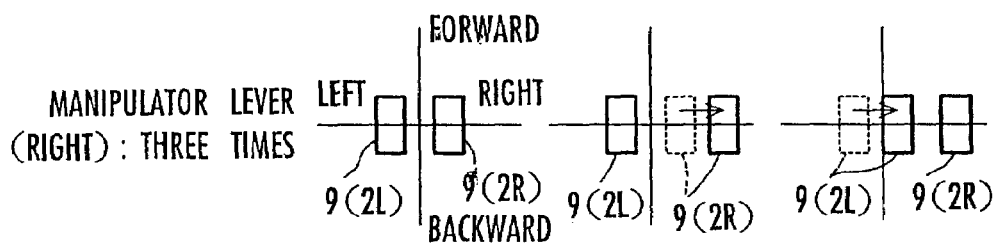
Figure 6:
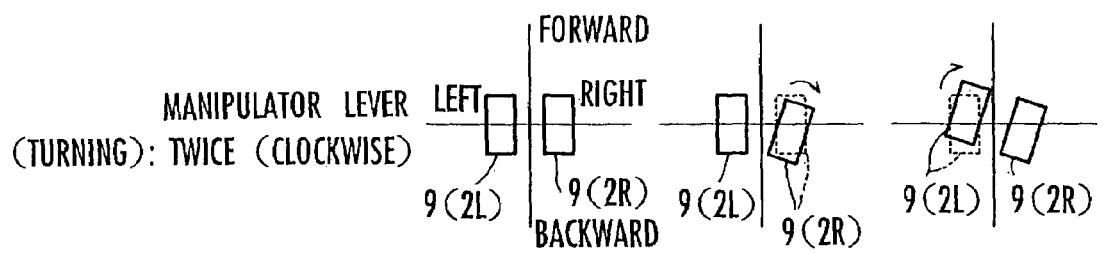

In other words, referring to FIG. 5, the arithmetic processing circuit 34 leads the liquid crystal display 30 to show an image G1 of coordinates with two axes for the forward/backward direction and the right/left direction having a current position of the robot A as an origin point, an image G2 showing a current position of the feet 9, 9 of the robot A, an image G3 showing a position and a direction of the feet 9, 9 after the movement of the robot A determined according to the current values for the forward/backward number variable X, the right/left number variable Y, and the turning number variable THZ, and an image G4 of numeric data showing the value of a moving amount in each direction corresponding to the current values for the forward/backward number variable X, the right/left number variable Y, and the turning number variable THZ.

Such indications of the liquid crystal display 30 allow the operator to successively and visually confirm a position (including an orientation) of the robot A after the movement caused by the operation of the manipulator 26 performed by the operator herself/himself.

On the other hand, the movement commanding data and the right/left manipulation distinguishing data, which is output from the arithmetic processing circuit 34 according to the processing of the arithmetic processing circuit 34 of the manipulator 23 as described above through the communication processing circuit 37 to the communication system 25, are given from the communication system 25 through the communication system 20 of the robot A to the ECU 19 of the robot A.

At this point, the ECU 19 generates a desired gait defining a motion pattern (walking pattern) of the legs 2, 2 of the robot A based on the given movement commanding data and the right/left manipulation distinguishing data, so that the legs 2, 2 are operated based on the desired gait so as to control the movement of the robot A. In this situation, the opened-legs-stop ON/OFF switch 29 is in the OFF state and the movement mode selected by the movement mode selecting switch 32 is the minor movement mode, so that the desired gait generated by the ECU 19 is a desired gait in a manner that the lifting/landing action for the two legs 2, 2 is performed one at a time in turn.

At this point, in generating the desired gait in the minor movement mode, the ECU 19 basically determines the leg 2 to be lifted first in moving based on the right/left manipulation distinguishing data. In other words, when the first operated manipulator lever 26 is ascertained to be the right-manipulator lever 26R according to the given right/left manipulation distinguishing data, the ECU 19 determines the right leg 2R as the leg 2 to be lifted first in moving, and when the first operated manipulator lever 26 is ascertained to be the left-manipulator lever 26L, the ECU 19 determines the left leg 2L as the leg 2 to be lifted first on the occasion of moving. However, when the setting data of the moving amount included in the given movement commanding data includes an instruction for moving in the right/left direction and the turning direction, in, consideration of easiness of ensuring a balance (stability) of the robot A and an avoidance against a mutual interference between the two feet 9, 9 in moving, the ECU 19 determines the leg 2, which exists on the same side of the indicated orientations of the movement in the right/left direction or the rotation of the turning direction, as the leg 2 to be lifted first of the two legs 2, 2. In other words, when the setting data of the moving amount includes the moving amount in a rightward direction or the clockwise direction, the right leg 2R is adapted to be the leg 2 to be lifted first, and when the setting data of the moving amount includes the moving amount in a leftward direction or the counterclockwise direction, the left leg 2L is adapted to be the leg 2 to be lifted first. Further, in the present embodiment, with respect to the movement in the forward/backward direction of the robot A, the leg 2 to be first lifted is attempted to be determined depending on which manipulator lever 26 is first operated, the right-manipulator lever 26R or the left-manipulator lever 26L. However, the leg 2 to be first lifted may be determined depending on which manipulator lever 26 is last operated, the right-manipulator lever 26R or the left-manipulator lever 26L.

In generating the desired gait in the minor movement mode, the ECU 19 determines a relative landing position (including an orientation) with respect to the foot 9 of the leg 2 on a supporting leg side of the foot 9 of the leg 2 (the leg 2 on a free leg side) to be first lifted depending on the setting values of the moving amount for every direction of the forward/backward, the right/left, and the turning directions of the robot A. More particularly, in moving the robot A, a landing position of the foot 9 of the leg 2 on the free leg side to be first lifted is determined to be a position moved only by the setting value for the moving amount in each direction of the forward/backward, the right/left, and the turning directions from a state that the foot 9 of the leg 2 on the free leg side is arranged in parallel with a specified space toward the side of the foot 9 of the leg 2 on the supporting leg side with the robot A in a stopped state. Furthermore, the ECU 19 determines a landing position of the foot 9 of the leg 2 to be secondly lifted as a position arranged in parallel with the above-mentioned specified space toward the side of the foot 9 of the leg 2 on the supporting leg side.

According to the movement control of the robot A based on the desired gait as described above, the robot A will be moved by the moving amount set by manipulating the manipulator lever 26 of the manipulator 23. Patterns of the movements of the robot A are exemplified in FIG. 6(a) to FIG. 6(d), and FIG. 7(a) and FIG. 7(b). Each view of these patterns illustrates movements schematically in chronological order from the left side of each view, from an initial state through a second step of the movements of the feet 9, 9 of the two legs 2, 2 in moving the robot A when the manipulator lever 26 is operated as included in the same view in the minor movement mode. In any case, in the initial state that the robot A is not moved, the feet 9, 9 of the legs 2, 2 are laterally arranged in parallel with the specified space. Further, in this initial state, as previously noted, the marching-in-place action of the legs 2, 2 of the robot A may be performed.

FIG. 6(a) is an example when only the right-manipulator lever 26 (forward) of the manipulator levers 26 is operated three times for instance. In this case, the variable for the forward/backward number variable X is +3, and the setting value for, the moving amount of the robot A will be the moving amount corresponding to the three operations of the manipulator lever 26 (forward) facing toward the front of the robot A. A setting value for the moving amount in the right/left and the turning directions of the robot A is "0". At this point, in setting the moving amount of the robot A by operating the manipulator 26, the right-manipulator 26 is first operated, so that at the first step, the foot 9 of the right leg 2R is lifted and landed on a position moved toward the front from the position of the initial state only by the setting value of the moving amount toward the front. At the second step, the foot 9 of the left leg 2L is lifted, and landed on a position arranged with the same space as in the initial state in parallel with the foot 9 of the right leg 2R. Accordingly, toward a direction (front) in response to an operation of the manipulator lever 26, the robot A will be moved by the moving amount set by this operation. Further, when only the left-manipulator lever 26 (forward) is operated three times, only the order of lifting/landing for the two legs 2, 2 differs from the FIG. 6(a), and the final position of the feet 9, 9 of the two legs 2, 2 after landing at the second step is the same as in FIG. 6(a).

The movement in the forward/backward direction of the robot A as described above is performed also in the same manner, when only either one of the right-manipulator lever 26 (backward) or the left-manipulator lever 26 (backward) is operated., This one example is shown in FIG. 6(b). In this situation, the movement differs from the case that only the manipulator lever 26 (forward) is operated, only in one respect that the moving direction of the foot 9 of each leg 2 in the first and the second steps is the rear direction. Further, the example of FIG. 6(b) is the example when the left-manipulator lever 26 (backward) is operated three times, so that at the first step, the lifting/landing of the left leg 2L is performed.

FIG. 6(c) is an example when only either one of the right-manipulator lever 26 (right) or the left-manipulator lever 26 (right) is operated three times, for instance. In this situation, a setting value of the moving amount of the robot A is the moving amount corresponding to the three operations of the manipulator lever 26 (right) facing toward the right of the robot A, and the setting value of the moving amount in the forward/backward direction and the turning direction is "0". In this situation, regardless of which manipulator lever is operated, the right-manipulator lever 26 (right) or the left-manipulator lever 26 (right), at the first step, the right leg 2R on the same side of the direction (toward the right in this case) of the movement of the robot A is lifted, and then landed on a position moved toward the right from the position of the initial state only by the setting value of the moving amount operated by the right-manipulator lever 26 (right) or the left-manipulator lever 26 (right). At the second step, after the foot 9 of the left leg 2L is lifted, the foot 9 is landed on a position that the initial state is made with respect to the foot 9 of the right leg 2R as is the same as the case in FIG. 6(a). Accordingly, toward the direction (toward the right) in respect to the operation of the manipulator 26 (right), the robot A is moved by the amount set by the operation. Additionally, at this point, the right leg 2R is moved at the first step, so that the robot A may be moved maintaining the stable posture without generating an interference of the two feet 9, 9. Further, when only either one of the right-manipulator lever 26 (left) or the left-manipulator lever 26 (left) is operated, the leg 2 lifted and landed at the first and the second steps and the direction that the leg 20, 2 is moved are the opposite of the FIG. 6(c), so that only this point differs from FIG. 6(c).

FIG. 6(d) is an example when only either one of the right-manipulator lever 26 (turning) or the left-manipulator lever 26 (turning) is operated twice for example in the clockwise direction. In this situation, the setting value of the moving amount of the robot A is a moving amount (rotating amount) corresponding to the two operations of the manipulator lever 26 (turning) in the turning direction of the robot A toward the clockwise direction, and the setting values of the moving amount in the forward/backward direction and the right/left direction are "0". In this situation, as in the case of moving the robot A in the right/left direction, regardless of which manipulator lever is operated, the right-manipulator lever 26 (turning) or the left-manipulator lever 26 (turning), at the first step, the right leg 2R on the same side of the direction (toward the right in this situation) after turning the robot A is lifted, and then landed on a position moved toward the clockwise direction from the position of the initial state only by the setting value of the moving amount operated by the right-manipulator lever 26 (turning) or the left-manipulator lever 26 (turning). At the second step, after the foot 9 of the left leg 2L is lifted, the foot 9 is landed on a position to be in the same state as the initial state with respect to the foot 9 of the right leg 2R. Accordingly, toward the direction (clockwise direction) in response to the operation of the manipulator lever 26 (turning), the robot A will be turned by the moving amount (rotating amount) set by the operation. Additionally, at this moment, the right leg 2R is moved at the first step, so that the robot A may move while maintaining a stable posture. Further, when only either one of the right-manipulator lever 26 (turning) or the left-manipulator lever 26 (turning) is operated in the counter-clockwise direction, the leg 2 lifting and landing at the first and the second steps and the turning direction of the foot 9 of the leg 2 are the opposite of the FIG. 6(d), so that only this point differs from FIG. 6(d).

Figure 7:
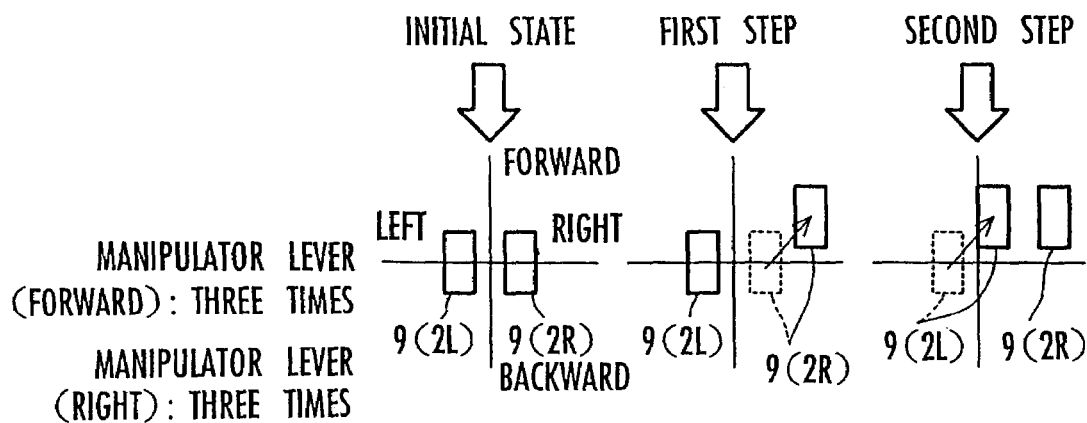
Figure 7:
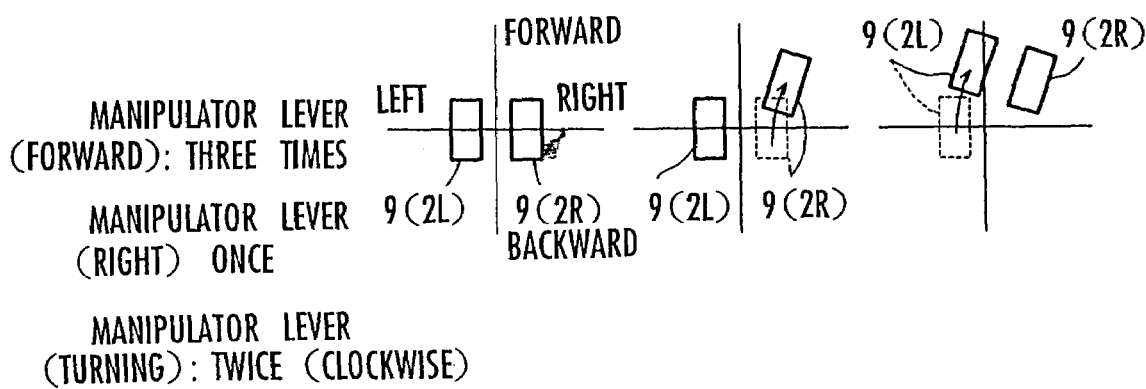

In the abovementioned examples in FIG. 6(a) to FIG. 6(d), while there has been described the movement of the robot A in only any one direction of the forward/backward, the right/left, and the turning directions, the robot A may also be moved in a manner that the movements in the respective directions are merged (composition of vectors) in the present embodiment. This example is shown in FIG. 7 (a) and FIG. 7(b). FIG. 7(a) is an example when either of the right-manipulator lever 26 (forward) or the left-manipulator 26

(forward) is operated three times and either of the right-manipulator lever 26 (right) or the left-manipulator lever 26 (right) is operated three times, for instance. In this situation, a setting value of the moving amount of the robot A has a moving amount in the forward/backward direction and a moving amount in the right/left direction. The setting value of the moving amount in the forward/backward direction is the moving amount corresponding to the three operations of the manipulator lever (front) toward the front of the robot A, and the setting value of the moving amount in the right/left direction is the moving amount corresponding to the three operations of the manipulator lever (right) toward the right of the robot A. In this situation, a setting value (≠0) of the moving amount toward the right of the robot A is included, so that at the first step, the right leg 2R is lifted to move toward the front from the position of the initial state only by the setting value of the moving amount operated by the manipulator 26 (forward), and landed on a position moved toward the right from the position of the initial state only by the setting value of the moving amount operated by the manipulator lever 26 (right). At the second step, after the foot 9 of the left leg 2L is lifted, the foot 9 is landed on a position to be in the same state as the initial state with respect to the foot 9 of the right leg 2R. Accordingly, toward a direction (toward the front in a right diagonal direction in FIG. 7(*a*)) determined according to the respective moving amounts in the forward/backward and the right/left directions by operating the manipulator lever 26 (forward) and the manipulator lever 26 (right), the robot A will be moved by the moving amount that these moving amounts are combined. Further, in the example of FIG. 7(*a*), the manipulator lever 26 (forward) and the manipulator lever 26 (right) are operated three times, respectively, so that the moving amounts of the robot A in the forward/backward direction and the right/left are identical to FIG. 6(*a*) and FIG. 6(*c*), respectively. Consequently, a final movement position of the robot A at the second step is identical with the case that the movements in FIG. 6(*a*) and FIG. 6(*c*) are performed in a sequential order.

The movement of the robot A as described above is performed in the same way when the manipulator 26 is operated to set a moving amount in every direction of the forward/backward, the right/left, and the turning directions, for example. This example is shown in FIG. 7 (*b*), in this example, either of the right-manipulator lever 26 (forward) or the left-manipulator lever 26 (forward) is operated three times and either of the right-manipulator lever 26 (right) or the left-manipulator lever 26 (right) is operated once, and furthermore, either of the right-manipulator lever 26 (turning) or the left-manipulator lever 26 (turning) is operated twice in the clockwise direction. At the first step in this situation, the right leg 2R is lifted to move toward the front from the position of the initial state only by the setting value of the moving amount operated by the manipulator 26 (forward) and move toward the right from the position of the initial state only by the setting value of the moving amount operated by the manipulator 26 (right), and landed on a position turned toward the clockwise direction from the position of the initial state only by the setting value of the moving amount (rotating amount in the clockwise direction) operated by the manipulator lever 26 (turning). At the second step, after the foot 9 of the left leg 2L is lifted, the foot 9 is landed on a position to be in the same state as the initial state with respect to the foot 9 of the right leg 2R. Accordingly, toward a direction determined according to the respective moving amounts in the forward/backward, the right/left, and the turning directions by operating the manipulator lever 26 (forward), the manipulator lever 26 (right), and the manipulator lever 26 (turning), the robot A will be moved by the moving amount that these moving amounts are combined. Further, in the example of FIG. 7(*b*), the manipulator lever 26 (forward) and the manipulator lever 26 (turning) are operated three times and twice, respectively, so that a moving amount in the forward/backward direction and a moving amount (rotating amount) in the turning direction of the robot A are the same as the conditions in FIG. 6(*a*) and FIG. 6(*b*), respectively. However, the manipulator lever 26 (right) is operated once, so that a moving amount in the right/left direction is less than the amount of the condition (the number of operations is three) in FIG. 6(*c*).

As has been described, in the minor movement mode (but, in the OFF state of the opened-legs-stop ON/OFF switch 29), the two legs 2, 2 are lifted and landed once at a time in turn. At this moment, at the first step, the foot 9 of the leg 2 to be lifted and landed is moved in the forward/backward, the right/left, and the turning directions only by the moving amounts set by operating the manipulator levers 26 of the manipulator 23, and at the second step, the two legs 2 are arranged in parallel, so that the robot A will be moved by a desired moving amount in a desired direction. Accordingly, the robot A may surely be moved by a relatively small moving amount to a desired position. In this situation, a moving amount toward each direction may be set by a simple operation of the manipulator lever 26. Further, in the present embodiment, in moving in the forward/backward direction (such as the movements in FIG. 6(*a*), FIG. 6(*b*)), the leg to be moved at the first step is adapted to be determined by which manipulator lever 26 of the manipulator 23 is operated first, the right-manipulator lever 26R or the left-manipulator lever 26L. However, in the minor movement mode (but, in the OFF state of the opened-legs-stop ON/OFF switch 29), only the final moving position of the robot A matters, so that basically, the leg to be moved at the first step may be either of the two legs 2. In this situation, for example, each leg 2 is determined to be lifted/landed at predetermined timing in synchronization with a predetermined clock, and when a moving amount is set by the manipulator 23 just before the lifting timing of the left leg 2L, the left leg 2L may be moved at the first step, or when the moving amount is set just before the lifting timing of the right leg 2R, the right leg 2R may be moved at the first step.

Subsequently, there is described an actuation in a case that the opened-legs-stop ON/OFF switch 29 of the manipulator 23 is operated to be brought into the ON state in a condition that the movement mode of the robot A is set at the minor movement mode. In this situation, a processing of the arithmetic processing circuit 34 in response to the operation of the manipulator lever 26 of the manipulator 23 is just as previously described, only the motion control of the legs 2, 2 executed by the ECU 19 of the robot A is slightly different from the basic actuation at the minor movement mode.

In other words, from a state that the feet 9, 9 of the two legs 2, 2 of the robot A are arranged in parallel with a predetermined space (the state shown in FIG. 6 and FIG. 7), the ECU 19 allows only one of the legs 2, 2 to perform a lifting/landing action only once, and after the lifting/landing action, a landed state of the two legs 2, 2 is maintained. In this situation, the foot 9 of the leg 2 performing the lifting/landing action is moved in each direction of the forward/backward, the right/left, and the turning directions according to the moving amounts set by the manipulator 23 in an analogous fashion with the first step in the minor movement mode. Additionally, in this situation, when the first operated manipulator lever 26 in setting a moving amount in each direction is the right-manipulator lever 26, the leg 2 performing the lifting/landing action is adapted to be the right leg 2R, and when that is the left-manipulator lever 26, the leg 2 performing the lifting/landing action is adapted to be the left leg 2L.

According to such a motion control of the leg 2 executed by the ECU 19, for example, when only the right-manipulator lever 26 (forward) is operated three times to set the moving amount of the robot A in a condition that the operator controls the opened-legs-stop ON/OFF switch 29 into the ON state, the action of the right leg 2R up to the first step in FIG. 6(a) is performed, so that the action of the legs 2, 2 is completed by this action up to the first step. Accordingly, the robot A will be stopped with the legs opened in a figure that the feet 9, 9 of the two legs 2, 2 are opened forward and backward. Additionally, for example, when only the right-manipulator 26 (right) is operated three times, the action of the right leg 2R up to the first step in FIG. 6(c) is performed, and this allows the robot A to be stopped with the legs opened in a figure that the feet 9, 9 of the two legs 2, 2 are opened to the right and the left. In addition, for example, when the right-manipulator lever 26 (forward) is operated three times and the right-manipulator lever 26 (right) is operated three times, the action of the right leg 2R up to the first step in FIG. 7(a) is performed, and this allows the robot A to be stopped with the legs opened in a figure that the foot 9 of the right leg 2R is stepped out toward the front in a right diagonal direction.

The operation of stopping the robot A with the legs opened as just described may be performed by other figures of the manipulator 26 in similar manner.

Subsequently, there is described an operation in a case that the major movement mode is selected as a movement mode of the robot A by the movement mode selecting switch 32. A basic processing description of the arithmetic processing circuit 34 of the manipulator 23 in the major movement mode is the same as that in the minor movement mode, and executed in the procedure as shown in the flowchart in FIG. 4. However, in this situation, the data table to be referred, to in setting the moving amounts in the forward/backward, the right/left, and the turning directions of the robot A in STEP 16 of FIG. 4 is a data table for the major movement mode. At this point, the major movement mode is a mode for moving the robot A by a relatively large moving amount in such a manner that the lifting/landing action for the two legs 2 of the robot A needs to alternately be performed multiple times (the moving action of the robot A is performed for multiple steps) as previously described. Accordingly, the respective moving amounts in the forward/backward, the right/left, an d the turning directions corresponding to the respective values for the forward/backward number variable X, right/left number variable Y, and turning number variable THZ are larger than those in the minor movement mode, for example, the order of several meters. In the present embodiment, the moving amount in each direction is set to a value proportional to the corresponding respective values for the number variable X, Y, and THZ as in the minor movement mode. However, this proportional relationship does not always need to be met as in the minor movement mode. Additionally, regarding the indications of the liquid crystal display 30 of the manipulator 23, the indicating description itself is the same manner in the case of the minor movement mode. However, sizes of images G2 and G3, and a unit of numeric data of the image G4 of the feet 9, 9 shown in FIG. 5 are adjusted to a scale of the moving amount of the robot A in the major movement mode.

On the other hand, the ECU 19 of the robot A determines a number of walking steps of the robot A and generates a desired gait of the legs 2, 2 of the robot A for each step based on the movement commanding data given from the manipulator 23 as previously described, thereby controlling the movement of the robot A by moving the legs 2, 2 of the robot A based on the desired gait.

In other words, the ECU 19 determines the number of walking steps to the target position defined according to the setting value of the moving amount based on a map or the like predetermined in consideration of ensuring stability while the robot A is moving, according to the setting values of the moving amounts in each direction of the forward/backward, the right/left, and the turning directions which the movement commanding data shows. Furthermore, the ECU 19 determines the moving amount toward each direction for each step of the robot A according to the determined number of walking steps and the setting value of the moving amount in each direction, so that the target gait for each step is generated based on this moving amount. In this situation, particularly at the last step, the target gait is generated in such a manner that the foot 9 of the leg 2 on the free leg side is arranged to be in parallel in the right/left direction with a predetermined space with respect to the foot 9 of the leg 2 on the supporting leg side as at the second step in the minor movement mode. Further, the leg 2 to be moved at the first step may basically be either of the two legs 2, 2, the right leg or the left leg. However, the leg 2 may be determined depending on which manipulator lever 26 is operated first by the manipulator 23, the right manipulator 26 or the left manipulator 26 (this is ascertained according to the right/left manipulation distinguishing data). Alternatively, the leg 2 to be moved at the first step may be determined depending on which manipulator lever 26 is operated last by the manipulator 23, the right-manipulator lever 26 or the left-manipulator lever 26.

As described above, according to the motion control of the robot A based on the generated target gait, the robot A will be moved by the moving amount set by operating the manipulator lever 26 of the manipulator 23. An embodiment of the movement of the robot A in this situation is exemplified in FIG. 8 to FIG. 12. Each view of these drawings schematically in a time series order describes the movement for each step from the initial state of the feet 9, 9 of the two legs 2, 2 (a condition that the feet 9, 9 are arranged side by side in a line with a predetermined space) in moving the robot A when the manipulator 26 is operated in the major movement mode as included in each view.

Figure 8:
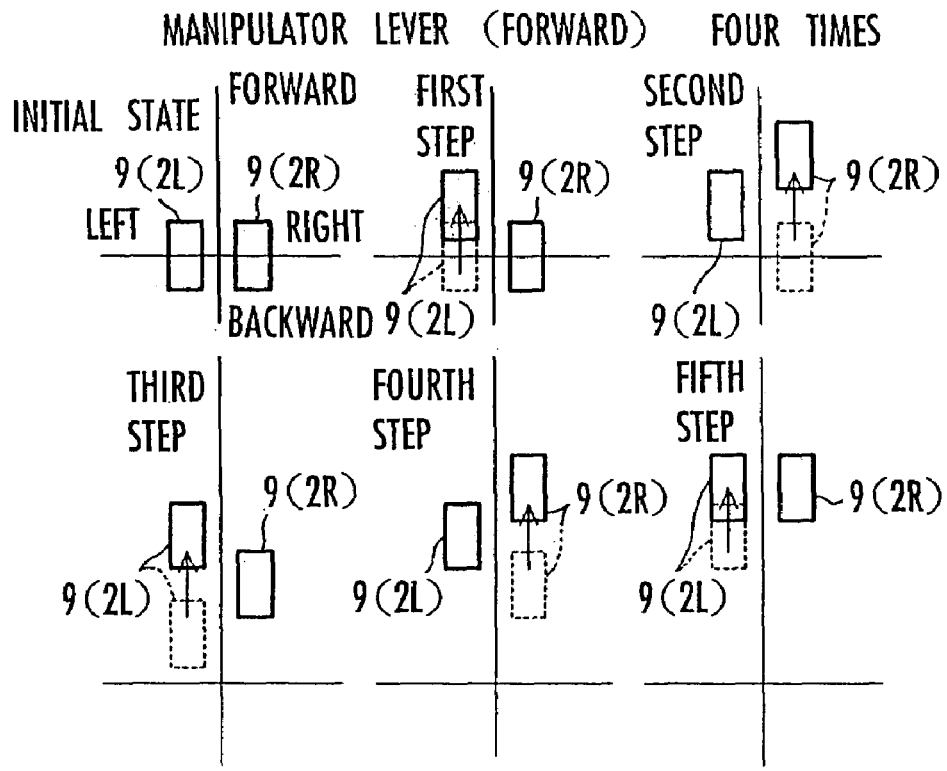

FIG. 8 shows an example in the case of operating only the manipulator lever 26 (forward) relating to the movement of the robot A toward the front four times, for instance. A setting value of a moving amount of the robot A in this situation is for a moving amount corresponding to the four operations of the manipulator lever 26 (forward) toward the front of the robot A, and the setting values of the moving amounts in the right/left, and the turning directions are "0". At this point, a number of walking steps to be needed for the movement of the robot A is set to be 5, for example. Up to the fourth step, the foot 9 of the leg 2 on a free leg side is landed on a position where this foot is forwardly moved by a predetermined amount in response to the setting value of the moving amount toward the front to the foot 9 of the leg 2 on a supporting leg side. At the last fifth step, the foot 9 of the leg 2 on the free leg side (the left leg 2L in the example of FIG. 8) is landed on a position to be in parallel with predetermined distance with respect to the foot 9 of the leg 2 on the supporting leg (the right leg 2R in the example of FIG. 8), so that both the feet 9, 9 will be in a state that is the same as the initial state. Accordingly, toward a direction (front) in response to the operation of the manipulator lever 26 (forward), the robot A will be moved by an amount set by this operation. Further, when only the manipulator lever 26 (back) is operated, an action of the leg 2 of the robot A is performed in the same manner in FIG. 8, except that the foot 9 of the leg 2 on the free leg side at each step is moved backward, in a manner opposite to FIG. 8.

Figure 9:
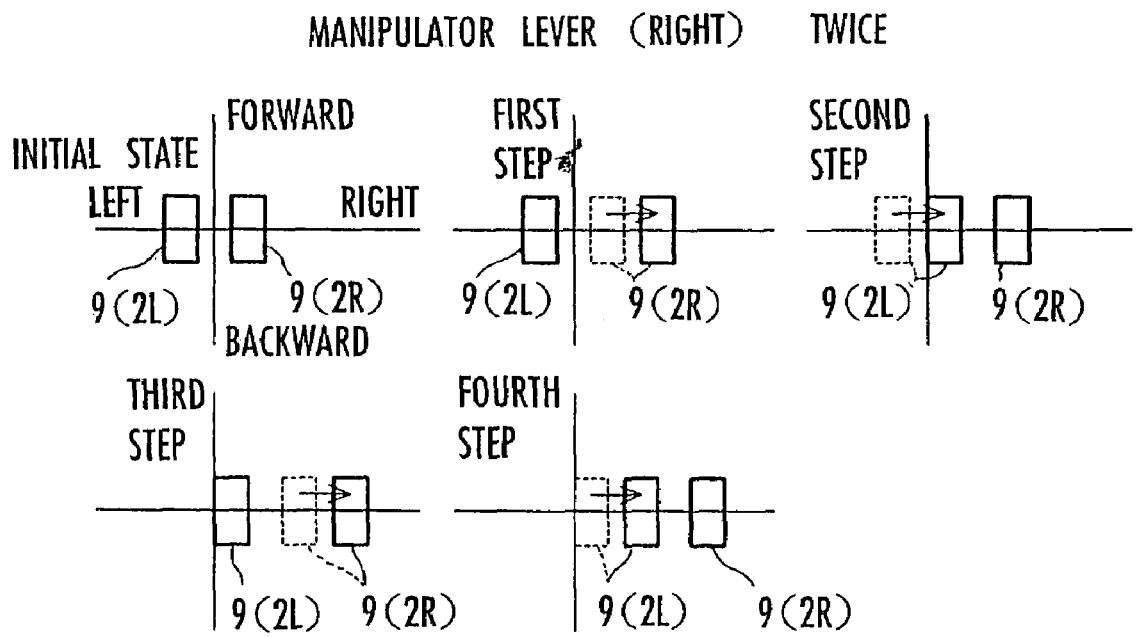

FIG. 9 shows an example in the case of operating only the manipulator lever 26 (right) relating to the movement of the robot A toward the right twice, for instance. A setting value of a moving amount of the robot A in this situation is for a moving amount corresponding to the two operations of the manipulator lever 26 (right) toward the right, and the setting values of the moving amounts in the forward/backward, and the turning directions are "0". At this point, a number of walking steps to be needed for the movement of the robot A is set to be 4, for example. At the first step and the third step (odd numbered steps), the right leg 2R on the same side of a direction that the robot A is moved toward (toward the right) is taken as a free leg, and the foot 9 of the right leg 2R is landed on a position where this foot is moved rightward by a predetermined amount in response to the setting value of the moving amount. At the second step and the fourth step (even numbered steps), the left leg 2L is taken as the free leg and landed on a position where the foot 9 of the left leg 2L and the foot 9 of the right leg 2R on the supporting leg side are arranged in parallel with the same predetermined space as that in the initial state. Accordingly, toward a direction (toward the right) in response to the operation of the manipulator lever 26 (right), the robot A will be moved by the moving amount set by this operation. Further, when only the manipulator lever 26 (left) is operated, the foot 9 of the left leg 2L is moved toward the left at odd numbered steps in a manner opposite to FIG. 9, and at even numbered steps, the foot 9 of the right leg 2R is arranged in parallel to the foot 9 of the left leg 2L in a state that is the same as the initial state.

Figure 10:
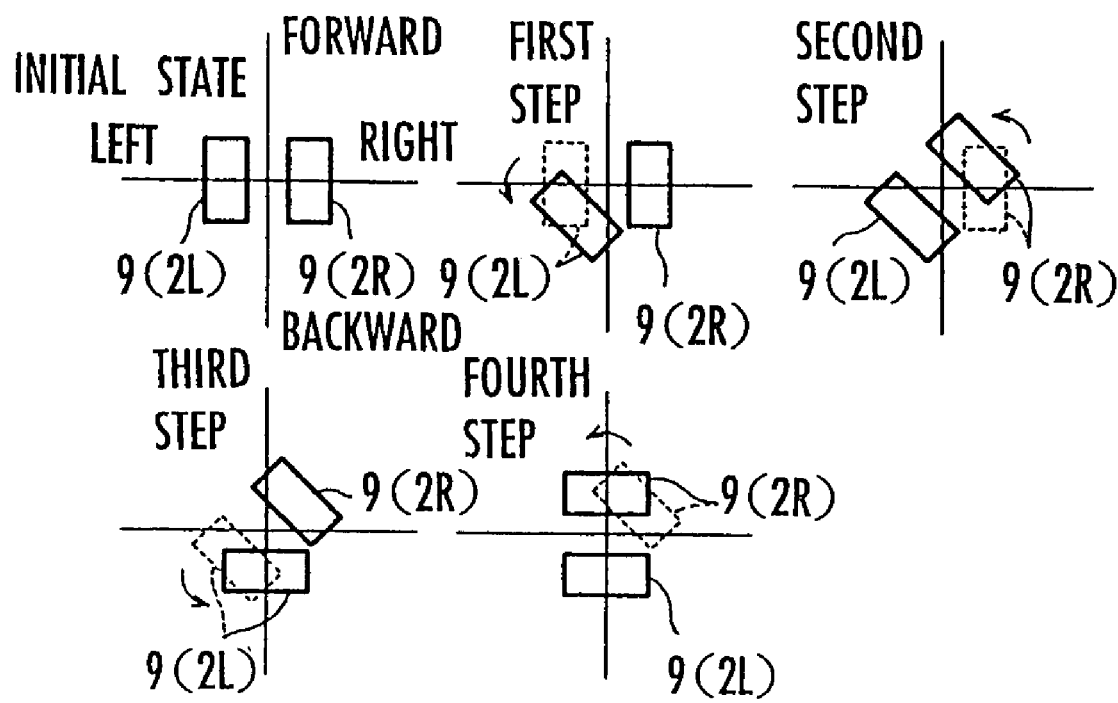

FIG. 10 shows an example in the case of operating only the manipulator lever 26 (turning) relating to the turning of the robot A in the counterclockwise direction twice, for instance. A setting value of a moving amount of the robot A in this situation is for a rotating amount corresponding to the two operations of the manipulator lever 26 (turning) toward the counterclockwise direction, and the setting values of the moving amounts in the forward/backward, and the right/left directions are "0". At this point, a number of walking steps to be needed for the movement of the robot A is set to be 4, for example. At the first step and the third step (odd numbered steps), the left leg 2L on the same side of a direction that the robot A is turned toward (toward the counterclockwise direction) is taken as a free leg, and the foot 9 of the left leg 2L is landed on a position where this foot is turned toward the counterclockwise direction by a predetermined amount in response to the setting value of the moving amount (rotating amount). At the second step and the fourth step (even numbered steps), the right leg 2R is taken as the free leg and landed on a position where the foot 9 of the right leg 2R and the foot 9 of the left leg 2L on the supporting leg side are arranged in parallel with the same predetermined space as that in the initial state. Accordingly, toward a direction (toward the counterclockwise direction) in response to the operation of the manipulator lever 26 (turning), the robot A will be turned by the moving amount (rotating amount) set by this operation. Further, when only the manipulator lever 26 (turning) is operated in the clockwise direction, the foot 9 of the right leg 2R is turned toward the clockwise direction at odd numbered steps in a manner opposite to FIG. 10, and at even numbered steps, the foot 9 of the left leg 2L is arranged in parallel to the foot 9 of the right leg 2R in a state that is the same as the initial state.

Figure 11:
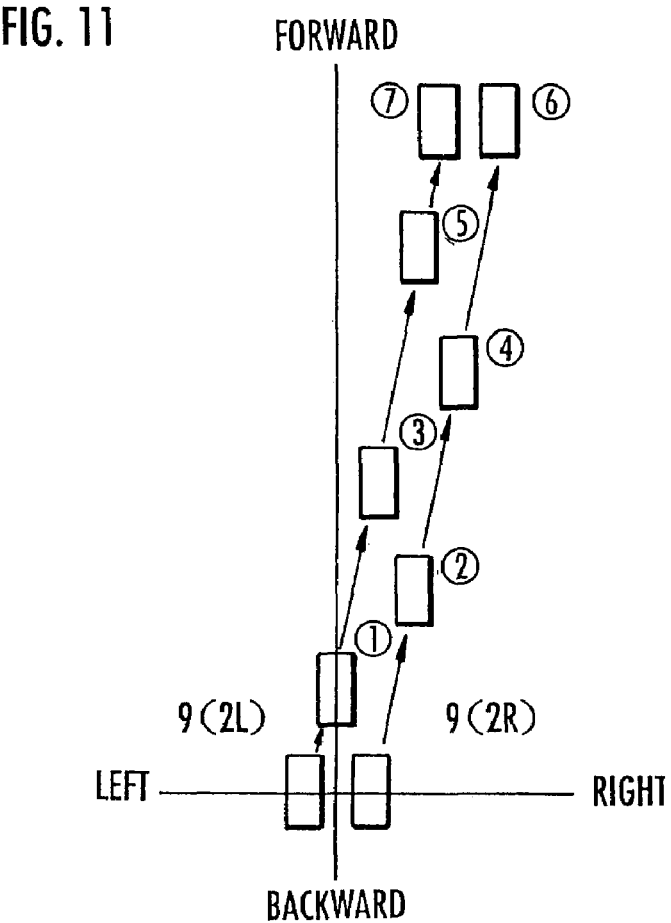
Figure 12:
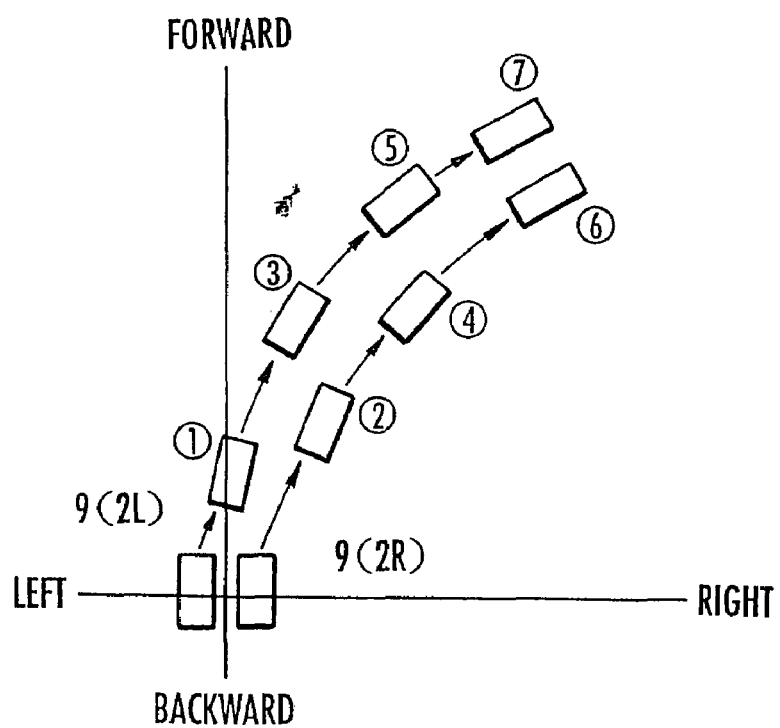

FIG. 8 to FIG. 10 described above show examples in the cases of operating the manipulator lever 26 in only one direction of the forward/backward, the right/left, and the turning directions, respectively. However, also in the major movement mode as in the case of the minor movement mode, the robot A may also be moved in a manner that the movements in the respective directions are combined. This example is shown in FIGS. 11 and 12. For instance, FIG. 11 shows an example in the case of operating the manipulator lever 26 (forward) six times and operating the manipulator lever 26 (right) twice. Further, a numeral in a circle in FIG. 11 indicates a number of walking steps. In this situation, setting values of moving amounts of the robot A are for the moving amount in the forward/backward direction and the moving amount in the right/left direction. The setting value of the moving amount in the forward/backward direction is for the moving amount in response to the six operations of the manipulator lever 26 (forward) toward the front of the robot A, and the setting value of the moving amount in the right/left direction is for the moving amount in response to the two operations of the manipulator lever 26 (right) toward the right of the robot A. At this point, a number of walking steps to be needed for the movement of the robot A is set to be 7, for example. Up to the sixth step, the leg 2 on a free leg side is landed on a position where this leg is moved toward the front by a predetermined amount in response to the setting value of the moving amount toward the front to the leg 2 on a supporting leg side, and this leg is moved toward the right by a predetermined amount in response to the setting value of the moving amount toward the right to the leg 2 on a supporting leg side. At the last seventh step, the foot 9 of the leg 2 on the free leg side (the left leg 2L in the example of FIG. 11) is landed on a position where the foot 9 of the leg 2 on the supporting leg (the right leg 2R in the example of FIG. 11) is arranged in parallel with a predetermined space inbetween, so that both the feet 9, 9 will be in a state that is the same as the initial state. Accordingly, toward a direction (toward the front in a right diagonal direction in FIG. 11) determined according to the respective moving amounts in the forward/backward, and the right/left directions by operating the manipulator lever 26 (forward) and the manipulator lever 26 (right), the robot A will be moved by the moving amount that these moving amounts are combined.

Additionally, FIG. 12 shows an example in the case of operating the manipulator lever 26 (forward) four times, operating the manipulator lever 26 (right) three times, and also operating the manipulator lever 26 (turning) in the clockwise direction once, for instance. Further, a numeral in a circle in FIG. 12 indicates a number of walking steps. In this situation, setting values of moving amounts of the robot A are for moving amounts in all the directions of the forward/backward, the right/left, and the turning directions. The setting value of the moving amount in the forward/backward direction is for the moving amount in response to the four operations of the manipulator lever 26 (forward) toward the front of the robot A, the setting value of the moving amount in the right/left direction is for the moving amount in response to the three operations of the manipulator lever 26 (right) toward the right of the robot A, and the setting value of the moving amount in the turning direction is for the moving amount in response to the one operation of the manipulator lever 26 (turning) toward the clockwise direction. At this point, a number of walking steps to be needed for the movement of the robot A is set to be 7, for example. Up to the sixth step, the leg 2 on a free leg side is landed on a position where this leg is moved toward the front by a predetermined amount in response to the setting value of the moving amount toward the front to the leg 2 on a supporting leg side, this leg is moved toward the right by a predetermined amount in response to the setting value of the moving amount toward the right to the leg 2 on a supporting leg side, and this leg is turned toward the clockwise direction by a predetermined amount in response to the setting value of the moving amount toward the clockwise direction. At the last seventh step, the foot 9 of the leg 2 on the free leg side (the left leg 2L in the example of FIG. 12) is landed on a position where the foot 9 of the leg 2 on the supporting leg (the right leg 2R in the example of FIG. 12) is arranged in parallel with a predetermined gap inbetween, so that both the feet 9, 9 will be in a state that is the same as the initial state. Consequently, toward a direction determined according to the respective moving amounts in the forward/backward, the right/left, and the turning directions by operating the manipulator lever 26 (forward), the manipulator lever 26 (right), and the manipulator lever 26 (turning), the robot A will be moved by the moving amount that these moving amounts are combined.

As has been described, in the major movement mode, the lifting/landing of the two legs 2, 2 of the robot A is performed for multiple steps, thereby allowing the robot A to be moved by a relatively large desired amount in a desired moving direction. In this situation, a relatively simple operation of the manipulator lever 26 may set a moving amount of the robot A in each direction.

Further, this is not employed in the present embodiment, but, when the opened-legs-stop ON/OFF switch 29 is operated into the ON state in the major movement mode, the robot A may be stopped with the two feet 9, 9 opened (for example, in a state at the sixth step in FIGS. 11 and 12) just like the case of the minor movement mode.

Figure 13:
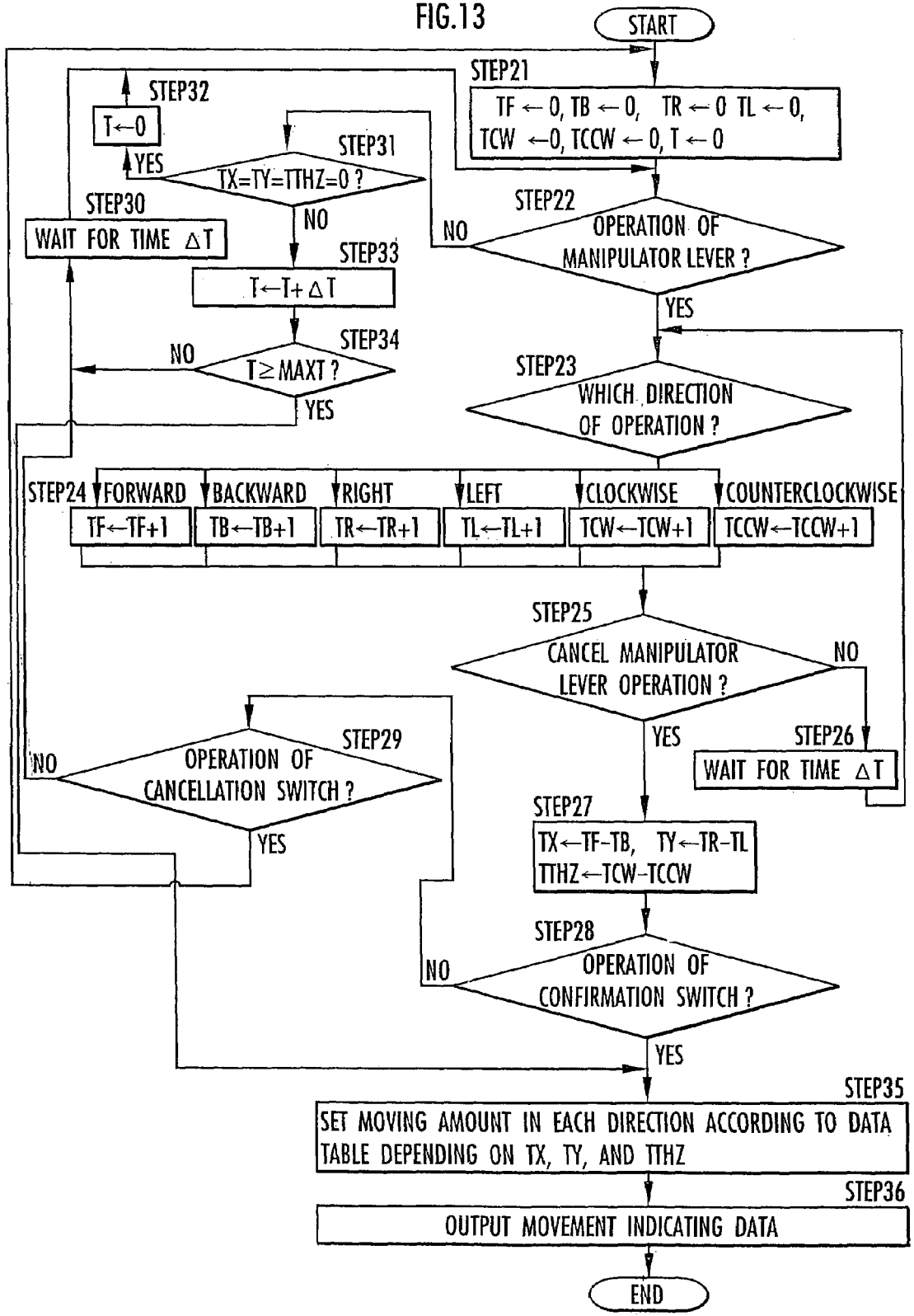
FIG. 13 is a flowchart for describing a processing of a manipulator of a remote control device in a second embodiment of the present invention.

Referring to FIG. 13, a second embodiment of the present invention is described. Further, the present embodiment is different from the first embodiment only in processing of the arithmetic processing circuit 34 of the manipulator 23, so that the present embodiment is described using the same reference numbers with the first embodiment, and descriptions for configurations and actuations which are the same as those in the first embodiment are omitted.

In the present embodiment, the arithmetic processing circuit 34 of the manipulator 23 executes a processing as shown in the flowchart in FIG. 13.

First, the arithmetic processing circuit 34 initializes values for various variables TF, TB, TR, TL, TCW, TCCW, and T to be "0" in STEP 21. At this point, the variables TF, TB, TR, and TL are the respective variables for clocking the time that the manipulator lever 26 (forward), the manipulator lever 26 (back), the manipulator lever 26 (right), and the manipulator lever 26 (left) are continuously pressed to be operated. In addition, the variables TCW and TCCW are the respective variables for clocking the time that the manipulator lever 26 (turning) is continuously operated in the clockwise direction and the counterclockwise direction (hereinafter, the variables TF, TB, TR, TL, TCW, and TCCW are referred to as operation time variables). Additionally, the variable T is the variable for clocking a duration in a state that none of the manipulator levers 26 is operated (hereinafter, the variable T is referred to as a non-operation time variable).

Subsequently, the arithmetic processing circuit 34 judges whether or not any of the manipulator levers 26 is operated based on an output of the manipulation signal generating circuit 33 (STEP 22). Furthermore, when any of the manipulator levers 26 is operated, the arithmetic processing circuit 34 judges which of the moving direction of the robot A the corresponding manipulator lever 26 is operated toward (STEP 23), and the value for the operation time variables TF, TB, TR, TL, TCW, or TCCW corresponding to the judged direction increases by "1" (STEP 24). Further, in STEP 24, the value for the operation time variable TF increases even when either of the left-manipulator levers 26L(turning) and right-manipulator levers 26R(turning) is operated. Such an increase occurs in the same fashion regarding the operation time variables TB, TR, and TL. Moreover, the value for the operation time variable TOW increases even when either of the left-manipulator levers 26L(turning) and right-manipulator levers 26R(turning) is operated in the clockwise direction. This increase occurs in the same fashion regarding the operation time variables TCCW.

After the processing of STEP 24, the arithmetic processing circuit 34 judges whether or not the operation of the manipulator lever 26 is released (STEP 25). At this point, when the operation of the manipulator lever 26 is continued, after waiting for the time of the predetermined specific time width $\Delta T$ (STEP 26), the arithmetic processing circuit 34 returns to the processing in STEP 23 and STEP 24, and the value for the operation time variable TF, TB, TR, TL, TCW, or TCCW is increased by "1". In this manner, as long as the operation of the manipulator lever 26 continues, for each abovementioned time width $\Delta T$, the value for the operation time variable TF, TB, TR, TL, TCW, or TCCW in response to the operation is increased by "1". Therefore, each value for the operation time variables TF, TB, TR, TL, TCW, and TCCW will show the time that the manipulator lever 26 is continuously operated corresponding to each direction.

On the other hand, according to the judgment in STEP 25, when the release of the operation of the manipulator lever 26 is confirmed, the arithmetic processing circuit 34, then calculates a deviation TX=TF−TB of the values for the operation time variables TF and TB in relation to the movement of the robot A in the forward/backward direction (hereinafter, referred to as a forward/backward time variable TX), a deviation TY=TR−TL of the values for the operation time variables TR and TL in relation to the movement of the robot A in the right/left direction (hereinafter, referred to as a right/left time variable TY), and a deviation TTHZ=TCW−TCCW of the values for the operation time variables TCW and TCCW in relation to the turning movement of the robot A (hereinafter, referred to as a turning time variable TTHZ) (STEP 27). Further, initial values for these time variables TX, TY, and TTHZ are "0".

Furthermore, the arithmetic processing circuit 34 judges whether or not the confirmation switch 27 is operated (STEP 28). At this point, when the operation of the confirmation switch 27 is confirmed, the arithmetic processing circuit 34 executes an after-mentioned processing in STEP 35 assuming that the operation of the manipulator lever 26 for moving the robot A is completed, and when the confirmation switch 27 is not operated, additionally, the arithmetic processing circuit 34 judges whether or not the cancellation switch 28 is operated (STEP 29). When the cancellation switch 28 is operated, the arithmetic processing circuit 34 returns to STEP 21 and executes the initialization processing. In addition, when the cancellation switch 28 is not operated in STEP 29, the arithmetic processing circuit 34 executes the judgment processing of STEP 22 (a processing for judging whether or not the manipulator lever 26 is operated) after waiting for the time of the predetermined time width ΔT (STEP 30).

When none of the manipulator levers 26 is operated according to the judgment in STEP 22, the arithmetic processing circuit 34 judges whether or not all of the forward/backward time variable TX, the right/left time variable TY, and the turning time variable TTHZ are "0" (STEP 31), and when TX=TY=TTHZ=0 is given, the arithmetic processing circuit 34 executes the judgment processing of STEP 22 after the value for the non-operation time variable T is set to be "0" (STEP 32). In addition; when any of TX, TY, or TTHZ is not "0", the value for the non-operation time variable T is increases only by the time width ΔT (STEP 33), and furthermore, the arithmetic processing circuit 34 judges whether or not this value for the non-operation time variable T reached the predetermined maximum value MAXT (STEP 34). At this point, when T<MAXT is given, the arithmetic processing circuit 34 executes the judgment processing of STEP 22, again after waiting for the time of the time width ΔT in the aforementioned STEP 30.

When T≧MAXT is given according to the judgment in STEP 34, in other words, when an elapsed time after the manipulator lever 26 was lastly operated has reached the maximum time MAXT without operating the cancellation switch 28, the confirmation switch 27, and the manipulator lever 26 (but, except when TX=TY=TTHZ=0 is given), in the same manner when the operation of the confirmation switch 27 is confirmed in the aforementioned STEP 28, the arithmetic processing circuit 34 assumes that the operation of the manipulator lever 26 for moving the robot A is completed, resulting in executing processing of STEP 35 to be described below.

In this STEP 35, according to the forward/backward time variable TX, the right/left time variable TY, and the turning time variable TTHZ, the arithmetic processing circuit 34 sets the moving amount in the forward/backward direction, the moving amount in the right/left direction, and the moving amount (rotating amount) in the turning direction of the robot A, respectively, based on the predetermined data table for each variable. At this position, like the first embodiment, the above data table is individually provided for each type of the movement modes of the robot A (the minor movement mode or the major movement mode) selected by the movement mode selecting switch 32, resulting in using the data table depending on respective movement modes. In this situation, the moving amount in each direction of the robot A set according to the data table for the minor movement mode is a relatively small moving amount which may move the robot A by alternately performing the lifting/landing action for the two legs 2, 2 of the robot A one at a time. Additionally, the movihg amount in each direction of the robot A set according to the data table for the major movement mode is a relatively large moving amount which may need to alternately perform the lifting/landing action for the two legs 2 of the robot A multiple times (performing the moving action of the robot A multiple steps).

In the present embodiment, the moving amount in each direction of the robot A is set to a value proportional to the values for the time variables TX, TY, and TTHZ corresponding to the respective moving amounts. At this point, the moving amount in the forward/backward direction set in response to the value for the forward/backward time variable TX(=TF−TB) is the moving amount toward the front when TX>0 is given, and that is the moving amount toward the back when TX<0 is given. In addition, the moving amount in the right/left direction set in response to the value for the right/left time variable TY(=TR−TL) is the moving amount toward the right when TY>0 is given, and that is the moving amount toward the left when TY<0 is given. Additionally, the moving amount in the turning direction set in response to the value for the turning time variable TTHZ(=TCW−TCCW) is the rotating amount in the clockwise direction when TTHZ>0 is given, and that is the rotating amount in the counterclockwise direction when TTHZ<0 is given. Further, when any value of the time variables TX, TY, or TTHZ is "0", the moving amount in a direction corresponding to this time variable of "0" is also "0". In addition, a relationship between each of the time variables TX, TY, and TTHZ, and the moving amount in each movement mode does not always need to satisfy proportionality, and basically, setting may be made as absolute values for the time variables TX, TY, and TTHZ increases, the moving amount in the corresponding direction increases.

In this manner, in the present embodiment, the moving amount in each direction of the forward/backward, the right/left, and the turning directions of the robot A is set according to the individual data table for each movement mode depending on the values for the time variables TX, TY, and TTHZ corresponding to the respective directions, so that the moving amount in each direction will be set depending on the continuous operation time of the manipulator lever 26 corresponding to the respective directions for each movement mode. Further, in this situation, before the processing of the arithmetic processing circuit 34 is changed to the processing in STEP 35, when the operation of the manipulator lever 26 toward the same direction is performed multiple times, as clearly shown according to the aforementioned processing of the arithmetic processing circuit 34, the operation time of this manipulator lever 26 will be a cumulative operation time.

After the moving amount in each direction of the forward/backward, the right/left, and the turning directions is set as described above, the arithmetic processing circuit 34 outputs the movement commanding data including the setting data for the moving amount for each direction and the data for the respective operation states of the opened-legs-stop ON/OFF switch 29 and the movement mode selecting switch 32 through the communication processing circuit 37, the communication system 25, and the communication system 20 of the robot A to the ECU 19 of the robot A (STEP 36). Accordingly, the processing of the arithmetic processing circuit 34 is completed. Further, in this situation, like the first embodiment, right/left manipulation distinguishing data showing which manipulator lever 26 is operated first (or last), the left-manipulator lever 26L or the right-manipulator lever 26R is output with the movement commanding data from the arithmetic processing circuit 34 of the manipulator 23 to the ECU 19 of the robot A. Consequently, in moving the robot A, a data description output from the arithmetic processing circuit 34 of the manipulator 23 to the ECU 19 of the robot A is the same as that of the first embodiment. Additionally, when output of the above movement commanding data or the like is completed, or after an actual movement of the robot A based on the movement commanding data or the like is completed, the processing of the arithmetic processing circuit 34 returns to "START" in FIG. 13.

In addition, although a description is not shown in the flowchart in FIG. 13, while one manipulator lever 26 is operated, the arithmetic processing circuit 34 of the manipulator 23 lights the LED lamps 31 in response to the value for the operation time variables TF, TB, TR, TL, TCW, or TCCW updated by this operation. In this situation, for example, the LED lamps 31 are lighted in a manner that as the value for each of the operation time variables TF, TB, TR, TL, TCW, and TCCW increases by the predetermined amount, a lighting number of the LED lamps 31 increases from one side toward the other side of an arrangement of the LED lamps 31. Accordingly, the operator may operate the manipulator lever 26 while visually recognizing the operation time of the manipulator lever 26 corresponding to a desired moving direction of the robot A, and then a change of the setting value for the moving amount to the moving direction. Further, the values for the operation time variables TF, TB, TR, TL, TCW, and TCCW showing the operation time of the manipulator lever 26 for each direction may be indicated by the liquid crystal display 30 or the like.

Furthermore, in the aforementioned STEP 27, with each update of the values for the forward/backward time variable TX, the right/left time variable TY, and the turning time variable TTHZ, the arithmetic processing circuit 34 determines the moving amount of the robot A in each direction of the forward/backward, the right/left, and the turning directions according to the data table used in the above STEP 35. The arithmetic processing circuit 34 allows the indication of the liquid crystal display 30 (refer to FIG. 5) based on the determined moving amount in each direction just as in the first embodiment. Accordingly, the operator will successively and visually confirm the position (including a direction) after the movement of the robot A by operating the manipulator lever 26 by herself/himself.

The processing described above is the processing of the arithmetic processing circuit 34 of the manipulator 23 in the present embodiment. After the movement commanding data is output from the arithmetic processing circuit 34 to the ECU 19 of the robot A, the ECU 19 executes the motion control of the legs 2, 2 of the robot A in the minor movement mode (including the control for stopping the legs opened), and the motion control of the legs 2, 2 of the robot A in the major movement mode just like the first embodiment. Consequently, also in the present embodiment, a relatively simple operation of the manipulator 23 allows the robot A to move in a desired direction to a desired position. In this situation, in the minor movement mode, the robot A may be moved to the desired position by a relatively small moving amount, and in the major movement mode, the robot A may be moved to the desired position by a relatively large moving amount.

Figure 14:
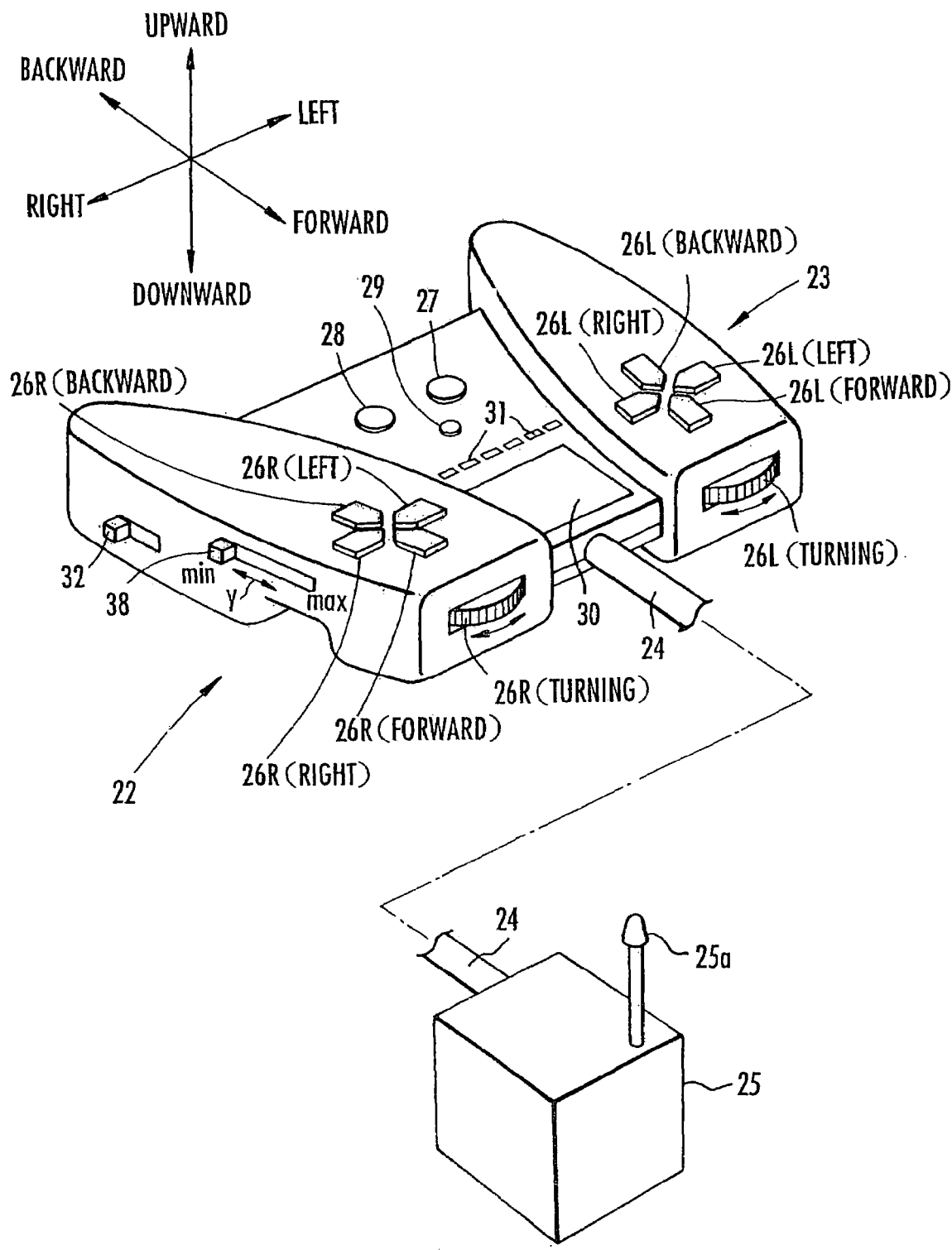
FIG. 14 is a perspective view showing a remote control device in a third embodiment of the present invention.
Figure 15:
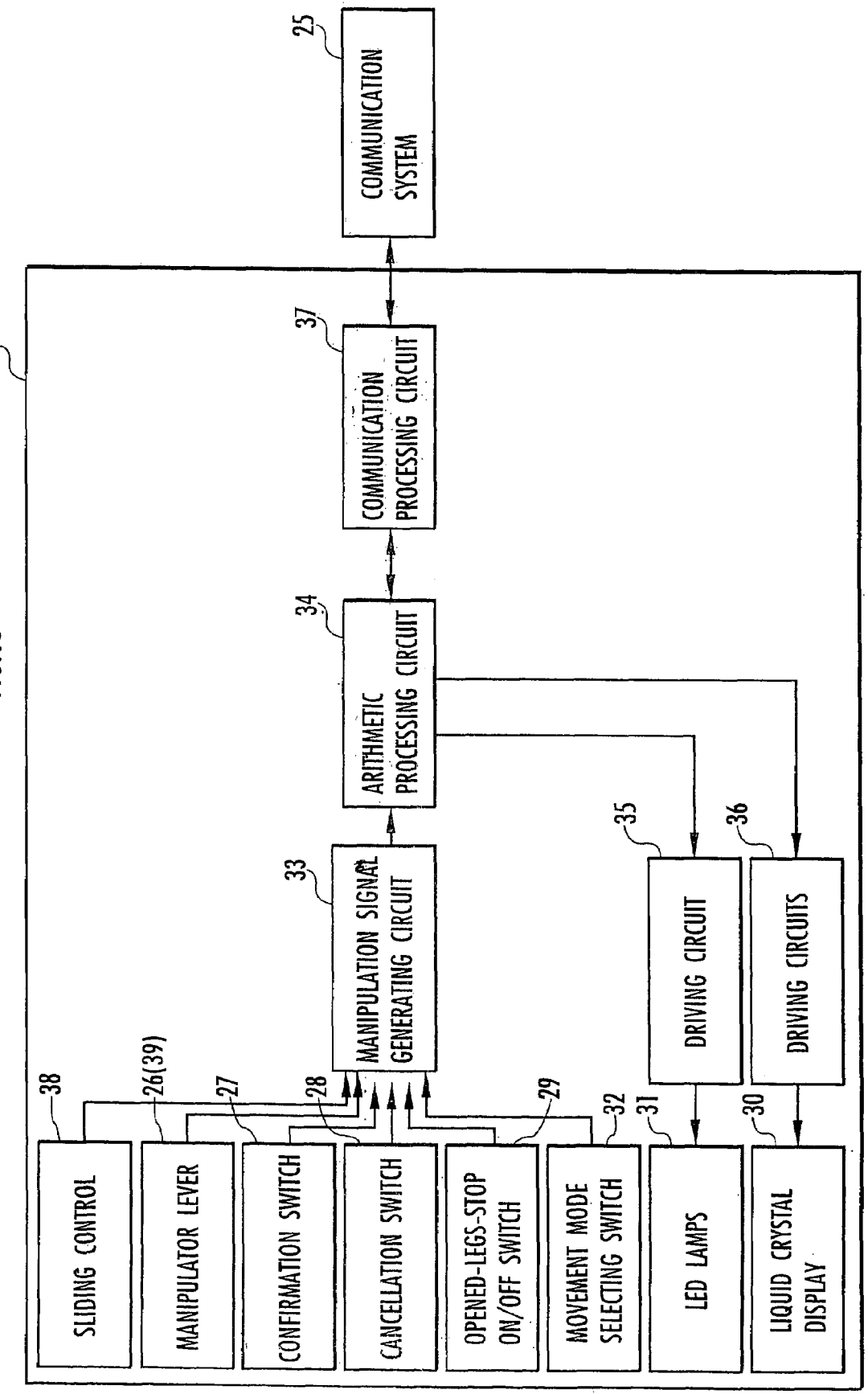
FIG. 15 a block diagram of a circuitry of a manipulator of the remote control device in FIG. 14.
Figure 16:
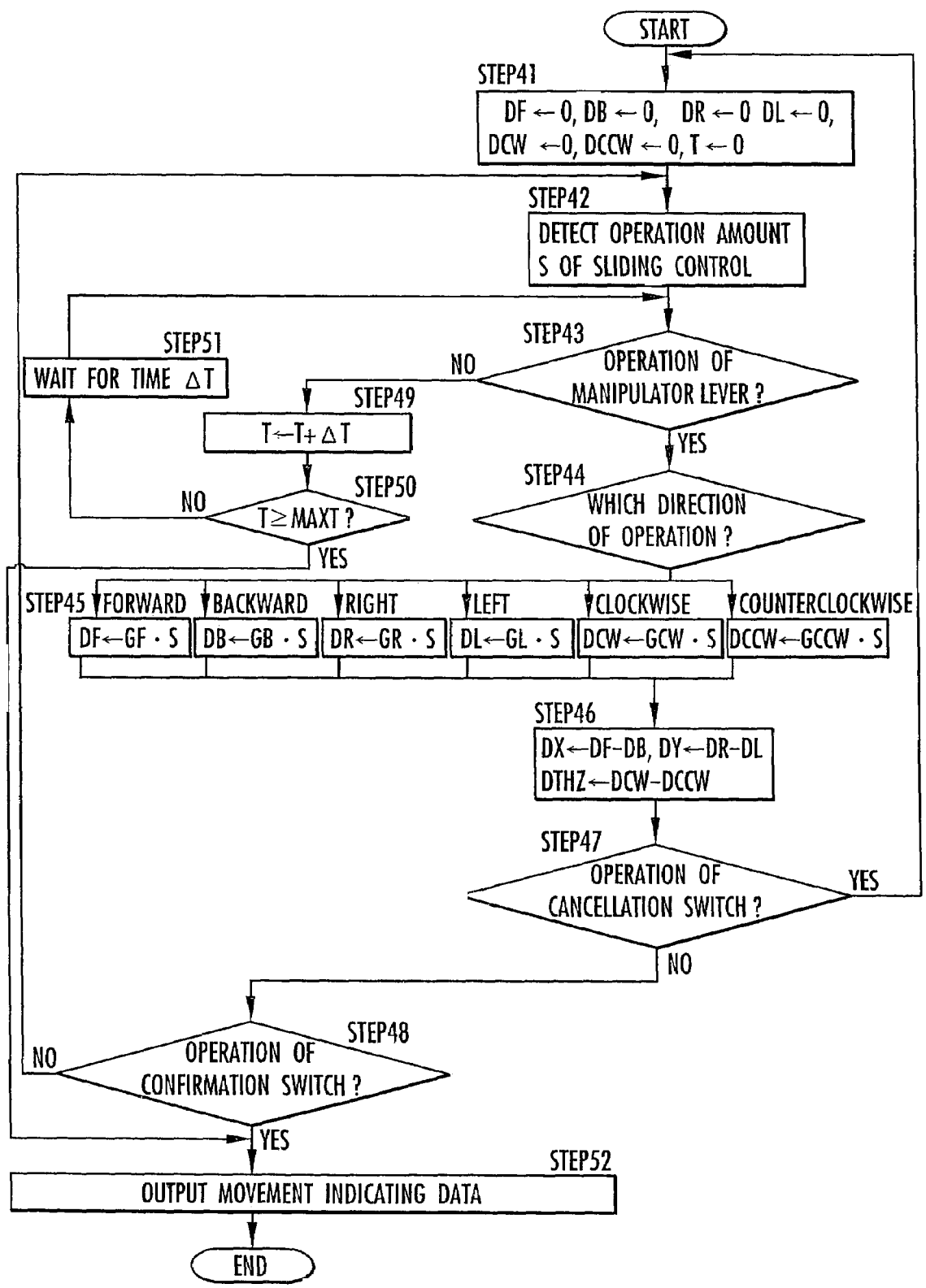
FIG. 16 is a flowchart for describing a processing of the manipulator of the remote control device in FIG. 14.

Referring to FIG. 14 to FIG. 16, a third embodiment of the present embodiment is described. Further, the present embodiment differs from the first embodiment only in a portion of the configuration of the manipulator and the processing of the arithmetic processing circuit 34, so that descriptions about configurations and operations, which are same as those in the first embodiment, are omitted while the same component portions or function portions are described using the same reference numbers.

As shown in FIG. 14, in the present embodiment, the manipulator 23 is provided with a sliding control 38 slidable in a backward/forward direction as shown on a side portion of the manipulator 23 with an arrow y, in addition to the configuration described in the first embodiment. This sliding control 38 is for setting the moving amount in each direction of the forward/backward, the right/left, and the turning directions of the robot A, and a manipulation amount (sliding amount) is increased from a position on a backward side (a min position shown) to a forward side in order to deal with increasing the moving amount of the robot A. The sliding control 38 is in a volume control style, and can be held in any slid position within the slidable range (a range from the min position to a max position shown). A structural configuration of the manipulator 23 in the present embodiment is same as that in the first embodiment except the above sliding control 38.

Additionally, an internal circuit of the manipulator 23 of the present invention shown in FIG. 15 comprises a manipulation signal generating circuit 33, an arithmetic processing circuit 34, a communication processing circuit 37, driving circuits 35 of LED lamps 31, and driving circuits 36 of a liquid crystal display 30, as in the first embodiment. However, in this situation, the manipulation signal generating circuit 33 in the present embodiment is adapted to output signals for operation states of the manipulator levers 26, the confirmation switch 27, the cancellation switch 28, the opened-legs-stop ON/OFF switch 29, and the movement mode selecting switch 32 to the arithmetic processing circuit 34, and in addition to these, further outputs a signal for showing the manipulation amount of the sliding control 38 to the arithmetic processing circuit 34.

Further, the sliding control 38 in the present embodiment is equivalent to a second manipulator lever in the third embodiment of the present invention, and the manipulator lever 26 is equivalent to a first manipulator lever in the third embodiment in the present invention. In addition, in the present embodiment, sliding control 38 is employed as the second manipulator lever, but a dial style control such as the manipulator lever 26(turning) for turning may also be employed.

In such a device of the present embodiment, the arithmetic processing circuit 34 of the manipulator 23 executes a processing as shown in a flowchart of FIG. 16.

First, the arithmetic processing circuit 34 initializes a value for each kind of variables DF, DB, DR, DL, DCW, DCCW, and T to be "0" in STEP 41. At this point, the variables DF, DB, DR, DL, DCW, and DCCW are variables expressing setting values for moving amounts in the forward, backward, right, left, clockwise, and counterclockwise directions of the robot A (hereinafter referred to as a moving amount variable). In addition, the variable T is a non-operation time variable for clocking a duration in a state that none of manipulator levers 26 is operated.

Subsequently, the arithmetic processing circuit 34 detects a current manipulation amount S of the sliding control 38 based on an output of the manipulation signal generating circuit 33 (STEP 42). At this point, in the present embodiment, when the operator sets a moving amount toward a desired direction of the robot A, the sliding control 38 is slid by only an amount corresponding to the desired moving amount from the min position toward the max position side in FIG. 14, and in this state, the manipulator lever 26 corresponding to the desired moving direction is operated. For example, when the operator wants to move the robot A forward by a predetermined amount, in addition to operating the sliding control 38 by only an amount corresponding to the desired moving amount, the operator operates either the manipulator lever 26R (forward) or the manipulator lever 26L (forward). The manipulation amount S of the sliding control 38 that the arithmetic processing circuit 34 detects in the above STEP 42 is the manipulation amount of the sliding control 38 that the operator operates as described above.

The arithmetic processing circuit 34 then judges whether or not any of manipulator levers 26 is operated based on the output of the manipulation signal generating circuit 33 (STEP 43). When any of the manipulator levers 26 is operated, the arithmetic processing circuit 34 judges which of the moving directions of the robot A the corresponding manipulator lever 26 is operated (STEP 44), and sets the value for the moving amount variable DF, DB, DR, DL, DCW, or DCCW corresponding to the judged direction to a value that the manipulation amount S of the sliding control 38 detected in STEP 42 is multiplied by a gain predetermined in each direction GF, GB, GR, GL, GCW, or GCCW (STEP 45). At this point, the gains GF, GB, GR, GL, GCW, and GCCW may be individual values, but in the present embodiment, the gains GF and GB corresponding to the forward direction and the backward direction, respectively are set to the same value, the gains GR and GL corresponding to the rightward direction and the leftward direction, respectively are set to the same value, and the gains GCW and GCCW corresponding to the clockwise direction and the counterclockwise direction, respectively are set to the same value. In addition, the gains GF, GB, GR, GL, GCW, and GCCW are individually determined for each movement mode (the minor movement mode and the major movement mode) set by the movement mode selecting switch 32, and the gains are set to relatively small values in the minor movement mode and relatively large values in the major movement mode depending on a scale of the moving amount of the robot A in each movement mode. Such a processing in STEP 45 allows the moving amount of the robot A depending on the manipulation amount S of the sliding control 38 to be set for each direction of the forward, backward, rightward, leftward, clockwise, and counterclockwise directions. Additionally, the moving amount set at this point will be individually set depending on which movement mode is selected, the major movement mode or the minor movement mode.

In succession to the processing of STEP 45, the arithmetic processing circuit 34 calculates a deviation DX=DF−DB of values for moving amount variables DF and DB relating to the movement in the forward/backward direction of the robot A, a deviation DY=DR−DL of values for moving amount variables DR and DL relating to the movement in the right/left direction of the robot A, and a deviation DTHZ=DCW−DCCW of values for moving amount variables DCW and DCCW relating to the turning movement of the robot A (STEP 46). These deviations DX, DY, and DTHZ indicates setting values of overall moving amounts of the robot A in the forward/backward direction, the right/left direction, and the turning direction, respectively (hereinafter, the deviations DX, DY, and DTHZ are referred to as a forward/backward moving amount variable DX, a right/left moving amount variable DY, and a turning moving amount variable DTHZ, respectively).

Subsequently, the arithmetic processing circuit 34 judges whether or not the cancellation switch 28 is operated (STEP 47). When the cancellation switch 28 is operated, the arithmetic processing circuit 34 executes the initialization processing of the aforementioned STEP 41. In addition, when the cancellation switch 28 is not operated in STEP 47, furthermore, the arithmetic processing circuit 34 judges whether or not the confirmation switch 27 is operated (STEP 48). At this point, when the operation of the confirmation switch 27 is confirmed, the arithmetic processing circuit 34 executes an after-mentioned processing of STEP 52 assuming that the operation of the manipulator lever 26 for moving the robot A is completed. Additionally, when the confirmation switch 27 is not operated, the arithmetic processing circuit 34 returns to the processing of STEP 42 and detects the manipulation amount S of the sliding control 38. In the judgment processing of STEP 43 in succession to this STEP 42, when none of the manipulator levers 26 is operated, after a value for the non-operation time variable T is increased by a predetermined specific time width ΔT (STEP 49), the arithmetic processing circuit 34 judges whether or not the value for the non-operation time variable T has reached a predetermined maximum time MAXT (STEP 50). At this point, when T<MAXT is given, the arithmetic processing circuit 34 waits for the time of the time width ΔT (STEP 51), and subsequently executes the judgment processing of the aforementioned STEP 43 (the processing for judging whether or not the manipulator lever 26 is operated).

When T≧MAXT is given according to the judgment of STEP 50, in other words, when an elapsed time after the last operation of the manipulator lever 26 has reached the maximum time MAXT without operating the cancellation switch 28, the confirmation switch 27, and the manipulator lever 26, in the same manner when the operation of the confirmation switch 27 is confirmed in the aforementioned STEP 48, assuming that the operation of the manipulator lever 26 for moving the robot A is completed, a processing of STEP 52 described below is executed.

In this STEP 52, the arithmetic processing circuit 34 considers values for the current forward/backward moving amount variable DX, right/left moving amount variable DY, and turning moving amount variable DTHZ as setting values of final moving amounts of the robot A in the forward/backward direction, the right/left direction, and the turning direction, respectively, and outputs the movement commanding data including the setting data and the data of the respective operating states of the opened-legs-stop ON/OFF switch 29 and the movement mode selecting switch 32 through the communication processing circuit 37, the communication system 25, and the communication system 20 of the robot A to the ECU 19 of the robot A. Accordingly, the processing of the arithmetic processing circuit 34 is completed. Further, in this situation, in STEP 52, like the first embodiment, the right/left manipulation distinguishing data indicating which manipulator lever 26 is operated first (or last), the left-manipulator lever 26L or the right-manipulator lever 26R is also output with the movement commanding data from the arithmetic, processing circuit 34 of the manipulator 23 to the ECU 19 of the robot A. Consequently, in moving the robot A, a data description output from the arithmetic processing circuit 34 of the manipulator 23 to the ECU 19 of the robot A is identical to that of the first embodiment. In addition, when the output of the above movement commanding data or the like is completed, or after an actual movement of the robot A based on the above movement commanding data or the like is completed, the processing of the arithmetic processing circuit 34 returns to "START" of FIG. 16.

The processing of the arithmetic processing circuit 34 as has been described allows the operator to set the moving amount of the robot A depending on the manipulation amount of the sliding control 38 by operating the sliding control 38 and the manipulator lever 26 in the corresponding direction in turn for each desired direction of the robot A. Further, in the present embodiment, the setting value for the moving amount in each direction will be proportional to the manipulation amount of the sliding control 38, but do not need to satisfy this proportionality, and may be set in such a manner that basically, as the manipulation amount of the sliding control 38 increases, the setting value for the moving amount in each direction increases. In this situation, the setting value for the moving amount with respect to the manipulation amount of the sliding control 38 may also be set according to the data table in each movement mode as in the first or the second embodiment.

In addition, although a description is not shown in a flowchart of FIG. 16, when the sliding control 38 is operated, the arithmetic processing circuit 34 of the manipulator 23 lights the LED lamps 31 depending on its manipulation amount. In this situation, for example, the LED lamps 31 are lighted in a manner that as the manipulation amount of the sliding control 38 increases by a predetermined amount, a lighting number of the LED lamps 31 increases from one side toward the other side of an arrangement of the LED lamps 31. Accordingly, the operator may operate the manipulator lever 26 while visually recognizing the manipulation amount of the sliding control 38 as well as a change of the setting value for the moving amount of the robot A corresponding to this manipulation amount.

Furthermore, in the aforementioned STEP 46, with each update of the values for the forward/backward moving amount variable DX, the right/left moving amount variable DY, and the turning moving amount variable DTHZ, the arithmetic processing circuit 34 allows the indication of the liquid crystal display 30 (refer to FIG. 5) based on the moving amount in each direction determined according to the values of these variables DX, DY, and DTHZ just as in the first embodiment. Accordingly, the, operator may successively and visually confirm the position (including a direction) after the movement of the robot A by operating the sliding control 38 and the manipulator lever 26 by herself/himself.

The processing as has been described is the processing of the arithmetic processing circuit 34 of the manipulator 23 in the present embodiment. After the movement commanding data is output from the arithmetic processing circuit 34 to the ECU 19 of the robot A, the ECU 19 executes the motion control of the legs 2, 2 of the robot A in the minor movement mode (including the control for stopping the legs opened), and the motion control of the legs 2, 2 of the robot A in the major movement mode just as in the first embodiment. Consequently, also in the present embodiment, a relatively simple operation of the manipulator 23 allows the robot A to be moved in a desired direction to a desired position. In this situation, in the minor movement mode, the robot A may be moved to the desired position by a relatively small moving amount, and in the major movement mode, the robot A may be moved to the desired position by a relatively large moving amount.

Further, in the processing of the arithmetic processing circuit 34 in each embodiment as has been described, when the time which the manipulator lever 26 is not operated exceeds the predetermined maximum time MAXT, the processing in the same manner when the confirmation switch 27 is confirmed is adapted to be executed, but, the processing in the same manner when the cancellation switch 28 is operated, may also be executed.

Subsequently, referring to FIG. 17, a fourth embodiment is described. The present embodiment is another embodiment of the first embodiment of the present invention. Further, the present embodiment differs from the first embodiment only in a portion of the configuration of the manipulator, so that descriptions about configurations and actuations, which are same as those in the first embodiment, are omitted while the same component portions or function portions are described using the same reference numbers.

Figure 17:
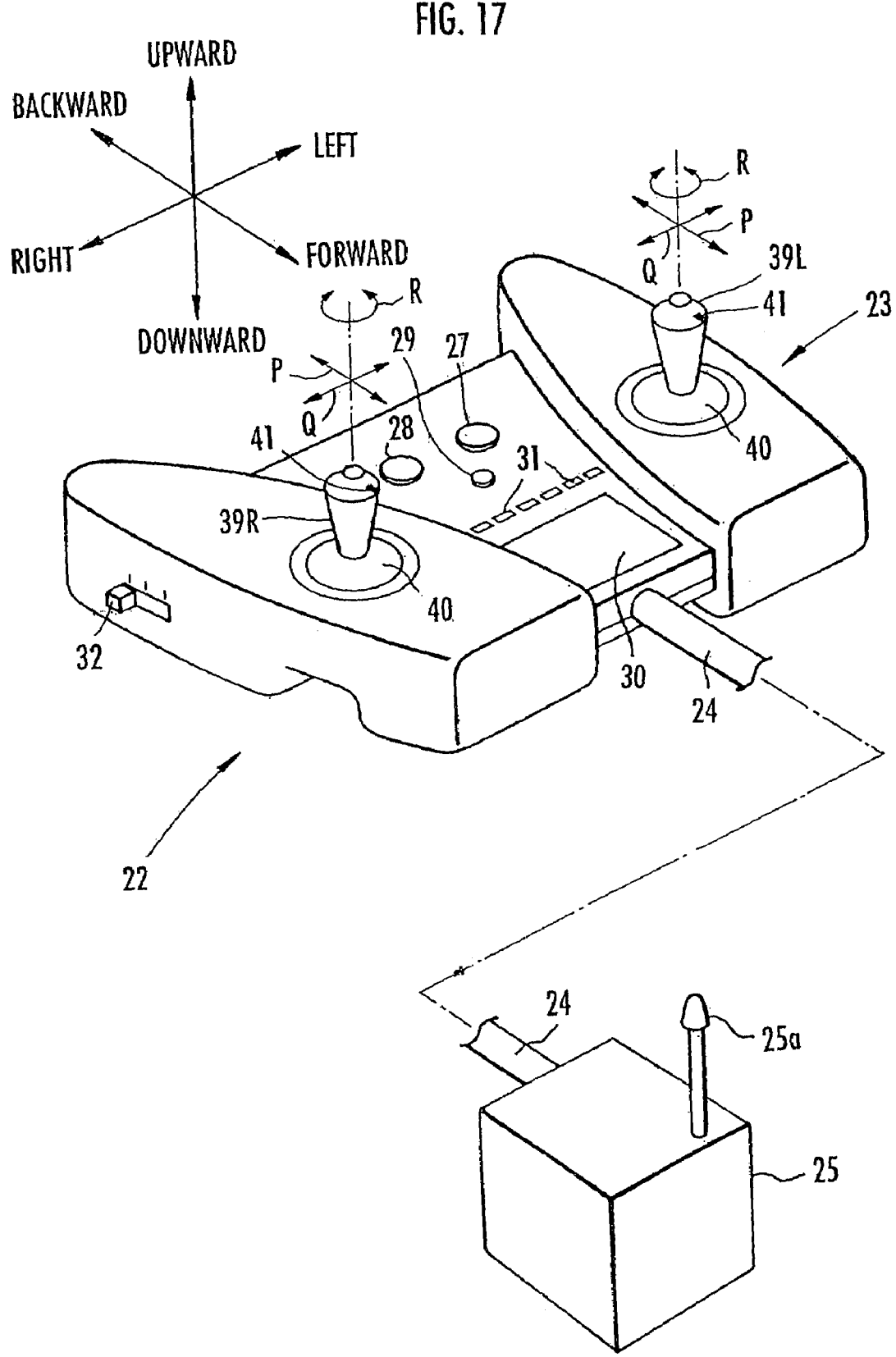
FIG. 17 is a perspective view showing a remote control device in a fourth embodiment of the present invention.

Referring to FIG. 17, the manipulator 23 of the present embodiment is provided with the manipulator levers 39R and 39L in a joystick shape instead of the right-manipulator lever 26R and the left-manipulator lever 26L according to the first embodiment, and the respective manipulator levers 39R and 39L are disposed on a rightward place and a leftward place on a surface portion of the manipulator 23 (according to the following description, the manipulator levers 39R and 39L may generically be referred to as the manipulator levers 39). In this situation, each manipulator lever 39 is provided in an extended condition on a top surface portion of a sphere 40 which is pivotably provided inside the manipulator 23, and the sphere 40 is rolled, so that as shown with arrows P, Q, and R, swinging in the forward/backward direction, swinging in the right/left direction, and rotating about an axis in a vertical direction (rotations in the clockwise direction and the counterclockwise direction) are possible. With respect to swinging or rotating action in each direction, each manipulator lever 39 is stood up in the vertical direction with a spring that is not shown, and energized in a neutral posture condition in a manner that a mark 41 marked on a periphery on each top surface portion faces forward.

With the manipulator 23 of the present embodiment provided with such a manipulator lever 39, an operation for swinging the manipulator lever 39R on the right side toward the front or the back for more than a predetermined amount is equivalent to the operation of the right-manipulator lever 26 (forward) or the right-manipulator lever 26 (backward) in the first embodiment, respectively, thereby corresponding to the movement toward the front and the movement toward the back of the robot A, respectively. Additionally, an operation for swinging the manipulator lever 39R toward the right or the left for more than a predetermined amount is equivalent to the operation of the right-manipulator lever 26 (right) or the right-manipulator lever 26 (left) in the first embodiment, respectively, thereby corresponding to the movement toward the right and the movement toward the left of the robot A, respectively. In addition, a operation for rotating the manipulator lever 39R toward the clockwise direction or the counterclockwise direction for more than a predetermined amount is equivalent to the operation of the right-manipulator lever 26 (turning) in the clockwise direction or the counterclockwise direction in the first embodiment, respectively, thereby corresponding to the turning movement in the clockwise direction and the turning movement in the counterclockwise direction of the robot A, respectively. The manipulator lever 39L on the left side is also operated in the same fashion.

Additionally, in addition to a minor movement mode (including a mode for stopping the robot A with legs opened) and a major movement mode with regard to movement modes of the robot A as in the first embodiment, the present embodiment further has a real time mode for executing the movement of the robot A almost in real time in response to the operation of the manipulator lever 39 of the robot A, so that the movement mode selecting switch 32 provided in the manipulator 23 of the present embodiment in order to alternatively select these movement modes is configured with three-position switch switchable to three types of operating positions corresponding to three types of movement modes.

Configurations other than the configuration has been described are the same as those in the first embodiment. However, in the present embodiment, in the internal circuit of the manipulator 23 (refer to FIG. 3), the manipulation signal generating circuit 33 generates a signal indicating the manipulation amount in each direction of the forward/backward direction, the right/left direction, and the rotating direction about an axis of each manipulator lever 39, and outputs thereof to the arithmetic processing circuit 34. According to this signal, the arithmetic processing circuit 34 recognizes which direction of the forward, backward, rightward, leftward, clockwise, and counterclockwise directions each manipulator lever 39 is operated in.

In such a device of the present embodiment provided with the manipulator 23, actuations in the minor movement mode and the major movement mode are just the same as those in the first embodiment, except a point that an operating method of the manipulator lever 39 of the manipulator 23 corresponding to each moving direction of the robot A differs from that of the first embodiment. Consequently, also in the present embodiment, a relatively simple operation of the manipulator lever 39 allows the robot A to be moved in a desired position.

In the present embodiment, in the real time mode, the robot A is moved almost in real time in response to the operation of the manipulator lever 39. For details of this actuation., the present applicant describes in detail in Japanese Patent Application No.2000-351753 or PCT International Publication Number WO 02/40227, and additionally, this is not a part of a main subject of the present invention, so that a detailed description is omitted herein, but its summary is as follows. In other words, the legs 2, 2 of the robot A alternately perform the lifting/landing action at a timing synchronized with a predetermined clock. At this point, at a time of the lifting/landing action of the left leg 2L, a relative moving amount and a moving direction of the foot 9 of the left leg 2L to the foot 9 of the right leg 2R is determined depending on the manipulation amount and the operating direction (including a rotating direction) of the manipulator lever 39L just before the lifting of the left leg 2L, and the foot 9 of the left leg 2L is landed on a position of this determined moving amount and moving direction. Additionally, at a time of the lifting/landing of the right leg 2R, a relative moving amount and moving direction of the foot 9 of the right leg 2R with respect to the foot 9 of the left leg 2L is determined depending on the manipulation amount and the operating direction (including the rotating direction) of the manipulator lever 39R just before the lifting of the right leg 2R, and the foot 9 of the right leg 2R is landed on a position of this determined moving amount and moving direction.

Further, in the present embodiment, the first embodiment of the present invention has been taken as an example and described, but a manipulator lever in a joystick shape may certainly be applied to the second embodiment or the third embodiment of the present invention. In this situation, when applied to the second embodiment of the present invention, the manipulator 23 described in the fourth embodiment instead of the manipulator 23 of the second embodiment may be used, and when applied to the third embodiment of the present embodiment, the manipulator 23 described in the fourth embodiment may be provided with the sliding control described in the third embodiment and be applied with a processing as in the third embodiment.

Additionally, in each of the first through the fourth embodiments as have been described, a setting processing of the moving amount of the robot A in the minor movement mode and the major movement mode is adapted to be executed by the arithmetic processing circuit 34 of the manipulator 23, but the processing of the arithmetic processing circuit 34 may also be executed by the ECU 19 of the robot A.

INDUSTRIAL APPLICABILITY

As stated above, the present invention is useful to provide a device that can easily operate a bipedal mobile robot, which can perform wide variety of works, by remote control.

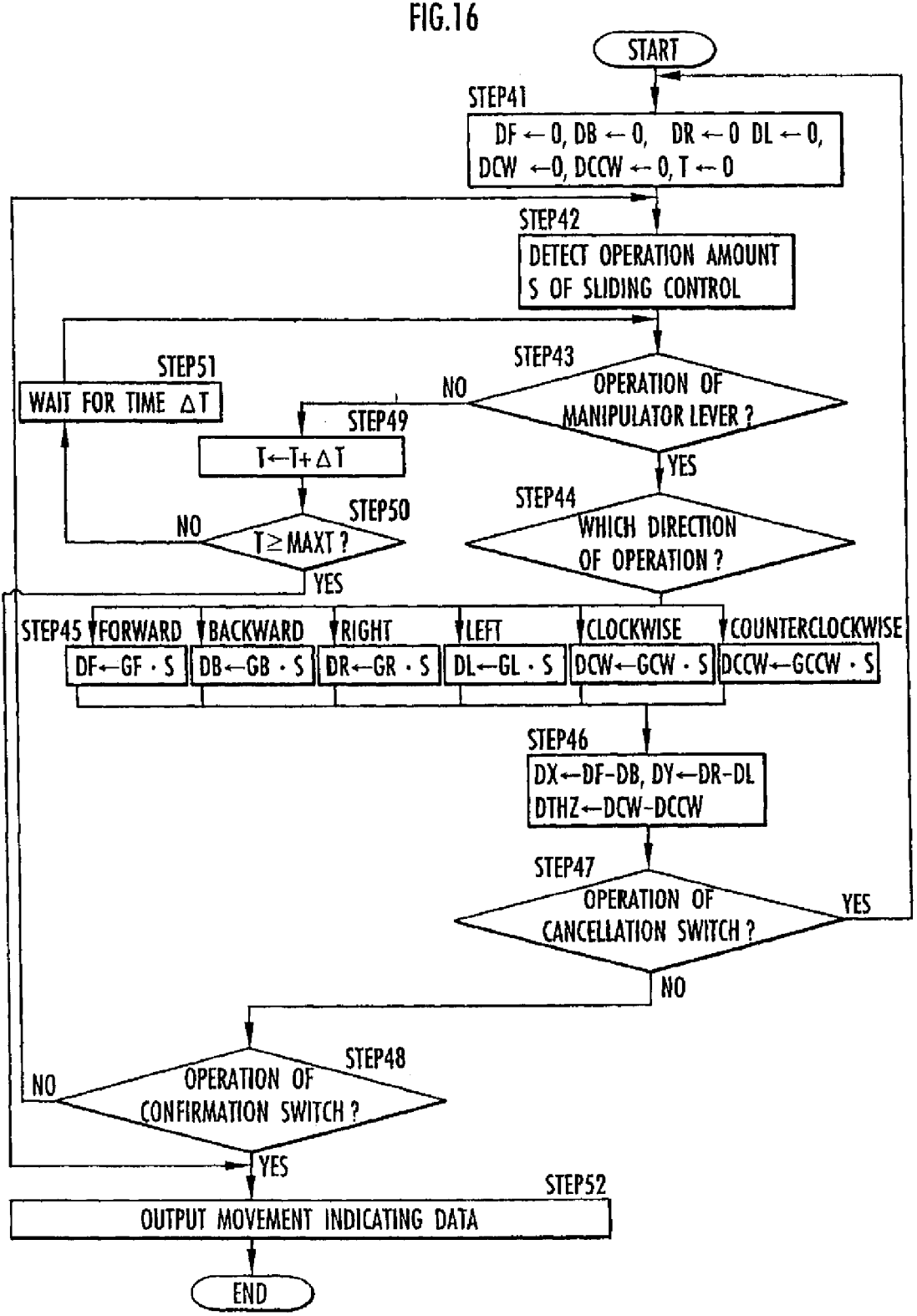

The invention claimed is:

1. A remote control device of a bipedal mobile robot moving by an action to alternately lift and land two legs, comprising:
   a manipulator lever for commanding a moving direction of the bipedal mobile robot;
   moving amount setting means for counting a number of times that the manipulator lever is operated from a non-manipulation state to a manipulation state corresponding to a desired direction of the bipedal mobile robot until predetermined manipulation completing conditions are satisfied in a stopped state of the bipedal mobile robot and setting the moving amount of the bipedal mobile robot in the desired direction in correspondence with the counted number; and
   movement control means for making the bipedal mobile robot to move toward the desired moving direction according to the set moving amount.

2. The device according to claim 1, wherein there are multiple types of moving directions of the bipedal mobile robot to be commanded by the manipulator lever, the moving amount setting means counts the number of times the manipulator lever is operated into a manipulation state corresponding to a moving direction for each type of moving directions, and sets the moving amount of the bipedal mobile robot depending on the counted number of times for each type of moving direction, and the movement control means combines the set moving amounts for each type of moving directions to make the bipedal mobile robot move.

3. The device according to claim 1, further comprising an indicating means for indicating post-movement position information showing a moved position from the current position of the bipedal mobile robot based on the moving amount set by the moving amount setting means before the bipedal mobile robot starts moving by the movement control means.

4. The device according to claim 1, wherein the moving amount set by the moving amount setting means comprises a moving amount the bipedal mobile robot can be moved by alternately lifting and landing each leg of the bipedal mobile robot, when the movement control means makes the bipedal mobile robot move, in a state that a foot of either one of the two legs of the bipedal mobile robot is landed, a foot of the other leg is landed on the position moved by the moving amount set by the moving amount setting means toward the desired moving direction with respect to the foot of the one leg, and then in a state that the foot of the other leg is landed, the foot of the one leg is moved to a position where the foot thereof is arranged in parallel with the foot of the other leg, thereby making the bipedal mobile robot move.

5. The device according to claim 4, further comprising means for setting an open-legged-stop mode for making the bipedal mobile robot stop with the legs opened by a predetermined operation after the bipedal mobile robot is moved, wherein when the open-legged-stop mode is set, in a state that the foot of either one of the two legs of the bipedal mobile robot is landed, the movement control means stops the two legs after the other leg is landed on a position that the other leg is moved toward the desired moving direction by the moving amount with respect to the foot of the one leg.

6. The device according to claim 1, wherein the moving amount set by the moving amount setting means comprises a moving amount which the bipedal mobile robot can be moved by the multiple walking steps of the moving action, when the movement control means makes the bipedal mobile robot move, the movement control means determines a number of walking steps of the bipedal mobile robot depending on the moving amount toward the desired moving direction set by the moving amount setting means, performs lifting and landing of each leg of the bipedal mobile robot by the determined walking steps and at the last walking step, has the foot of the leg to be lifted and landed to move to a position where the foot thereof is arranged in parallel with the foot of the leg on the supporting leg side, thereby making the bipedal mobile robot move.

7. The device according to claim 1, further comprising means for selecting, by a predetermined operation, a first movement mode for setting a moving amount wherein the bipedal mobile robot can be moved by alternately lifting and landing each leg of the bipedal mobile robot with the moving amount setting means, and a second movement mode for setting a moving amount wherein the bipedal mobile robot can be moved by the multiple walking steps of the moving action with the moving amount setting means, wherein when the bipedal mobile robot is moved in a state that the first movement mode is selected, in a state the foot of either one of the two legs of the bipedal mobile robot is landed, the movement control means lands the foot of the other leg with respect to the foot of the one leg on a position where the foot thereof is moved by the moving amount set by the moving amount setting means corresponding to the first movement mode, in the desired moving direction, then in a state that the foot of the other leg is landed, the foot of the one leg is moved to the position where the foot thereof is arranged in parallel with the foot of the other leg, thereby making the bipedal mobile robot move;

and when the bipedal mobile robot is moved in a state that the second movement mode is selected, the movement control means determines a number of walking steps of the bipedal mobile robot depending on the moving amount toward the desired moving direction set by the moving amount setting means corresponding to the second movement mode, performs lifting and landing of each leg of the bipedal mobile robot by the determined number of walking steps, and has the foot of the leg to be lifted and landed to move to a position where the foot thereof is arranged in parallel with the foot of the leg on the supporting leg side at the last walking step, thereby making the bipedal mobile robot move.

8. A remote control device of a bipedal mobile robot moving by an action to alternately lift and land two legs, comprising:

a manipulator lever for commanding the moving direction of the bipedal mobile robot;

moving amount setting means for clocking a time the manipulator lever is continuously maintained in a manipulation state corresponding to a desired direction of the bipedal mobile robot after a non-manipulation state until predetermined manipulation completing conditions are satisfied in a stopped state of the bipedal mobile robot, and setting a moving amount of the bipedal mobile robot toward the desired moving direction depending on the clocked time; and movement control means for making the bipedal mobile robot move toward the desired moving direction according to the set moving amount.

9. The device according to claim 8, wherein when the operation to the manipulation state corresponding to the desired direction of the manipulator lever is performed multiple times, after the operation of the manipulator lever is started until the manipulation completing conditions are satisfied, the moving amount setting means cumulatively clocks the time the manipulator lever is continuously maintained in the manipulation state, thereby setting the moving amount depending on the clocked time until the time the manipulation completing conditions are satisfied.

10. The device according to claim 8, further comprising information means for informing every time the moving amount corresponding to the clocked time changes by a predetermined moving amount with an increase in the clocked time during the operation of the manipulator lever.

11. The device according to claim 8, wherein there are multiple types of moving directions of the bipedal mobile robot to be commanded by the manipulator lever, the moving amount setting means clocks the time the manipulator lever is continuously maintained in the manipulation state corresponding to the moving direction for each type of moving direction, and sets the moving amount of the bipedal mobile robot depending on the clocked time for each type of moving direction, and the movement control means combines the set moving amounts for each type of moving directions to make the bipedal mobile robot move.

12. The device according to claim 8, further comprising an indicating means for indicating post-movement position information showing a moved position from the current position of the bipedal mobile robot based on the moving amount set by the moving amount setting means before the bipedal mobile robot starts moving by the movement control means.

13. The device according to claim 8, wherein the moving amount set by the moving amount setting means comprises a moving amount the bipedal mobile robot can be moved by alternately lifting and landing each leg of the bipedal mobile robot, when the movement control means makes the bipedal mobile robot move, in a state that a foot of either one of the two legs of the bipedal mobile robot is landed, a foot of the other leg is landed on the position moved by the moving amount set by the moving amount setting means toward the desired moving direction with respect to the foot of the one leg, and then in a state that the foot of the other leg is landed, the foot of the one leg is moved to a position where the foot thereof is arranged in parallel with the foot of the other leg, thereby making the bipedal mobile robot move.

14. The device according to claim 13, further comprising means for setting an open-legged-stop mode for making the bipedal mobile robot stop with the legs opened by a predetermined operation after the bipedal mobile robot is moved, wherein when the open-legged-stop mode is set, in a state that the foot of either one of the two legs of the bipedal mobile robot is landed, the movement control means stops the two legs after the other leg is landed on a position that the other leg is moved toward the desired moving direction by the moving amount with respect to the foot of the one leg.

15. The device according to claim 8, wherein the moving amount set by the moving amount setting means comprises a moving amount which the bipedal mobile robot can be moved by the multiple walking steps of the moving action, when the movement control means makes the bipedal mobile robot move, the movement control means determines a number of walking steps of the bipedal mobile robot depending on the moving amount toward the desired moving direction set by the moving amount setting means, performs lifting and landing of each leg of the bipedal mobile robot by the determined walking steps and at the last walking step, has the foot of the leg to be lifted and landed to move to a position where the foot thereof is arranged in parallel with the foot of the leg on the supporting leg side, thereby making the bipedal mobile robot move.

16. The device according to claim 8, further comprising means for selecting, by a predetermined operation, a first movement mode for setting a moving amount wherein the bipedal mobile robot can be moved by alternately lifting and landing each leg of the bipedal mobile robot with the moving amount setting means, and a second movement mode for setting a moving amount wherein the bipedal mobile robot can be moved by the multiple walking steps of the moving action with the moving amount setting means, wherein when the bipedal mobile robot is moved in a state that the first movement mode is selected, in a state the foot of either one of the two legs of the bipedal mobile robot is landed, the movement control means lands the foot of the other leg with respect to the foot of the one leg on a position where the foot thereof is moved by the moving amount set by the moving amount setting means corresponding to the first movement mode, in the desired moving direction, then in a state that the foot of the other leg is landed, the foot of the one leg is moved to the position where the foot thereof is arranged in parallel with the foot of the other leg, thereby making the bipedal mobile robot move;

and when the bipedal mobile robot is moved in a state that the second movement mode is selected, the movement control means determines a number of walking steps of the bipedal mobile robot depending on the moving amount toward the desired moving direction set by the moving amount setting means corresponding to the second movement mode, performs lifting and landing of each leg of the bipedal mobile robot by the determined number of walking steps, and has the foot of the leg to be lifted and landed to move to a position where the foot thereof is arranged in parallel with the foot of the leg on the supporting leg side at the last walking step, thereby making the bipedal mobile robot move.

17. A remote control device of a bipedal mobile robot moving by an action to alternately lift and land two legs, comprising:

a first manipulator lever having a manipulation state and a non-manipulation state commanding a moving direction of the bipedal mobile robot;

a second manipulator lever that can variably be operated in response to a manipulation amount depending on a desired moving amount of the bipedal mobile robot and be maintained in a voluntary manipulation amount condition;

moving amount setting means for setting the moving amount of the bipedal mobile robot toward the desired moving direction depending on the manipulation amount of the second manipulator lever, when the first manipulator lever is operated into the manipulation state corresponding to the desired moving direction in a condition that the second manipulator lever is operated by the desired manipulation amount during a stopped state of the bipedal mobile robot; and movement control means for making the bipedal mobile robot move toward the desired moving direction by the set moving amount.

18. The device according to claim 17, wherein there are multiple types of the moving directions of the bipedal mobile robot that can be indicated by the manipulator lever, the moving amount setting means sets the moving amount depending on the manipulation amount of the second manipulator lever for each type of moving directions, and the movement control means combines the set moving amounts for each type of moving directions to make the bipedal mobile robot move.

19. The device according to claim 17, further comprising an indicating means for indicating post-movement position information showing a moved position from the current position of the bipedal mobile robot based on the moving amount set by the moving amount setting means before the bipedal mobile robot starts moving by the movement control means.

20. The device according to claim 17, wherein the moving amount set by the moving amount setting means comprises a moving amount the bipedal mobile robot can be moved by alternately lifting and landing each leg of the bipedal mobile robot, when the movement control means makes the bipedal mobile robot move, in a state that a foot of either one of the two legs of the bipedal mobile robot is landed, a foot of the other leg is landed on the position moved by the moving amount set by the moving amount setting means toward the desired moving direction with respect to the foot of the one leg, and then in a state that the foot of the other leg is landed, the foot of the one leg is moved to a position where the foot thereof is arranged in parallel with the foot of the other leg, thereby making the bipedal mobile robot move.

21. The device according to claim 20, further comprising means for setting an open-legged-stop mode for making the bipedal mobile robot stop with the legs opened by a predetermined operation after the bipedal mobile robot is moved, wherein when the open-legged-stop mode is set, in a state that the foot of either one of the two legs of the bipedal mobile robot is landed, the movement control means stops the two legs after the other leg is landed on a position that the other leg is moved toward the desired moving direction by the moving amount with respect to the foot of the one leg.

22. The device according to claim 17, wherein the moving amount set by the moving amount setting means comprises a moving amount which the bipedal mobile robot can be moved by the multiple walking steps of the moving action, when the movement control means makes the bipedal mobile robot move, the movement control means determines a number of walking steps of the bipedal mobile robot depending on the moving amount toward the desired moving direction set by the moving amount setting means, performs lifting and landing of each leg of the bipedal mobile robot by the determined walking steps and at the last walking step, has the foot of the leg to be lifted and landed to move to a position where the foot thereof is arranged in parallel with the foot of the leg on the supporting leg side, thereby making the bipedal mobile robot move.

23. The device according to claim 17, further comprising means for selecting, by a predetermined operation, a first movement mode for setting a moving amount wherein the bipedal mobile robot can be moved by alternately lifting and landing each leg of the bipedal mobile robot with the moving amount setting means, and a second movement mode for setting a moving amount wherein the bipedal mobile robot can be moved by the multiple walking steps of the moving action with the moving amount setting means, wherein when the bipedal mobile robot is moved in a state that the first movement mode is selected, in a state the foot of either one of the two legs of the bipedal mobile robot is landed, the movement control means lands the foot of the other leg with respect to the foot of the one leg on a position where the foot thereof is moved by the moving amount set by the moving amount setting means corresponding to the first movement mode, in the desired moving direction, then in a state that the foot of the other leg is landed, the foot of the one leg is moved to the position where the foot thereof is arranged in parallel with the foot of the other leg, thereby making the bipedal mobile robot move;

and when the bipedal mobile robot is moved in a state that the second movement mode is selected, the movement control means determines a number of walking steps of the bipedal mobile robot depending on the moving amount toward the desired moving direction set by the moving amount setting means corresponding to the second movement mode, performs lifting and landing of each leg of the bipedal mobile robot by the determined number of walking steps, and has the foot of the leg to be lifted and landed to move to a position where the foot thereof is arranged in parallel with the foot of the leg on the supporting leg side at the last walking step, thereby making the bipedal mobile robot move.

* * * * *

UNITED STATES PATENT AND TRADEMARK OFFICE
CERTIFICATE OF CORRECTION

| | |
|---|---|
| PATENT NO. | : 7,221,999 B2 |
| APPLICATION NO. | : 10/488055 |
| DATED | : May 22, 2007 |
| INVENTOR(S) | : Sano |

It is certified that error appears in the above-identified patent and that said Letters Patent is hereby corrected as shown below:

In the Drawings, Sheet 14 of 15, the label "FIG. 16" is missing, please replace Sheet 14 of 15 with the attached sheet.

Signed and Sealed this

Twenty-fourth Day of November, 2009

David J. Kappos
*Director of the United States Patent and Trademark Office*